US012682883B2

(12) United States Patent
Wang et al.

(10) Patent No.: US 12,682,883 B2

(45) Date of Patent: Jul. 14, 2026

(54) ACTIVE NOISE REDUCTION SYSTEM

(71) Applicant: HONDA MOTOR CO., LTD., Tokyo (JP)

(72) Inventors: Xun Wang, Saitama (JP); Toshio Inoue, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 114 days.

(21) Appl. No.: 18/794,462

(22) Filed: Aug. 5, 2024

(65) Prior Publication Data

US 2025/0054484 A1 Feb. 13, 2025

(30) Foreign Application Priority Data

Aug. 9, 2023 (JP) ................................ 2023-130170

(51) Int. Cl.
*G10K 11/178* (2006.01)

(52) U.S. Cl.
CPC .. *G10K 11/17825* (2018.01); *G10K 11/17854* (2018.01); *G10K 11/17883* (2018.01); *G10K 2210/1282* (2013.01)

(58) Field of Classification Search
CPC ....... G10K 11/17825; G10K 11/17854; G10K 11/17883
See application file for complete search history.

(56) References Cited

U.S. PATENT DOCUMENTS 9,344,795 B2 5/2016 Iwamoto et al.
10,672,378 B1 * 6/2020 Bastyr .............. G10K 11/17833
11,205,413 B2 12/2021 Bastyr et al.
2017/0178617 A1 * 6/2017 Christoph ........ G10K 11/17853
2018/0190258 A1 * 7/2018 Mohammad ............ G10L 15/02
2021/0193103 A1 * 6/2021 Zollner ............ G10K 11/17833
2022/0238093 A1 7/2022 Inoue et al.
(Continued)

FOREIGN PATENT DOCUMENTS

JP 2001051703 A 2/2001
JP 2014006709 A 1/2014
(Continued)

OTHER PUBLICATIONS

Notice of Reasons for Refusal for Japanese Patent Application No. 2023-130170 dated Feb. 25, 2025; 10 pp.

*Primary Examiner* — Olisa Anwah
(74) *Attorney, Agent, or Firm* — Armstrong Teasdale LLP

(57) ABSTRACT

An active noise reduction system includes a canceling sound output device configured to output a canceling sound, an error microphone configured to generate an error signal, and a controller configured to control the canceling sound output device based on the error signal. The controller includes a control signal generation unit including a control filter configured to generate a control signal for controlling the canceling sound output device, and a sound field learning unit including a secondary path filter that represents an estimation value of a transfer function of a secondary path from the canceling sound output device to the error microphone, the control filter and the secondary path filter are configured to be adaptively updated, and the controller is configured to differentiate a timing of an adaptive update of the control filter and a timing of an adaptive update of the secondary path filter.

13 Claims, 19 Drawing Sheets

(56) References Cited

U.S. PATENT DOCUMENTS

| | | | | |
|---|---|---|---|---|
| 2022/0375449 | A1* | 11/2022 | Griffin | G10K 11/17854 |
| 2023/0282194 | A1* | 9/2023 | Kim | G10K 11/17854 |
| 2023/0306947 | A1* | 9/2023 | Bastyr | G10K 11/17879 |
| 2023/0317050 | A1* | 10/2023 | Wang | G10K 11/17854<br>381/71.4 |
| 2023/0368770 | A1* | 11/2023 | Baudet | G10K 11/17825 |
| 2024/0112665 | A1* | 4/2024 | Hsu | G10K 11/17825 |
| 2024/0179463 | A1* | 5/2024 | Okawa | H04R 3/04 |
| 2024/0274114 | A1* | 8/2024 | Cha | G10K 11/17857 |
| 2024/0357305 | A1* | 10/2024 | Feng | G10K 11/17883 |

FOREIGN PATENT DOCUMENTS

| | | | |
|---|---|---|---|
| JP | 2014182303 | A | 9/2014 |
| JP | 2020184071 | A | 11/2020 |
| JP | 2022115627 | A | 8/2022 |

* cited by examiner $P=Sd$
$\Delta T=Sd \times Ts$

Fig.17

T

| control channel | error microphone | reference microphone | state of $\hat{C}$ | update flag of $\hat{C}$ |
|---|---|---|---|---|
| Ch1 | microphone M2 | microphone M1 | update necessary state | 0: no update |
| Ch2 | microphone M2 | microphone M1 | update necessary state | 1: update |
| ... | ... | ... | ... | ... |
| ChS | microphone Mm | microphone M1 | update unnecessary state | – |

ACTIVE NOISE REDUCTION SYSTEM

TECHNICAL FIELD

The present invention relates to an active noise reduction system that reduces a noise by causing a canceling sound that is in an opposite phase to the noise to interfere with the noise.

BACKGROUND ART

In recent years, taking into account people in vulnerable situations such as the elderly and children among traffic participants, efforts have been actively made to provide access to sustainable transportation systems for such people. Toward its realization, research and development for further improving the safety and convenience of traffic through development of vehicle comfort are attracting attention.

To improve vehicle comfort, it is desirable to reduce the noise inside a vehicle. As such, research and development of an active noise reduction system, which reduces the noise by causing a canceling sound that is in an opposite phase to the noise to interfere with the noise, are actively conducted.

BACKGROUND ART

For example, JP2014-6709A discloses an active noise reduction system including a control filter (see "an adaptive filter C1 for a control signal" in JP2014-6709A) that can be adaptively updated, and a secondary path filter (see "an adaptive filter K for a secondary path" in JP2014-6709A) that can be adaptively updated.

In JP2014-6709A, the adaptive update of the control filter and the adaptive update of the secondary path filter are performed simultaneously (see paragraph 0046 of JP2014-6709A). Accordingly, the calculation load on a controller becomes large during the adaptive updates of the control filter and the secondary path filter. Accordingly, the controller needs to be composed of an expensive processor that can withstand such a large calculation load, which may cause an increase in the manufacturing cost of the active noise reduction system.

SUMMARY OF THE INVENTION

In view of the above background, an object of the present invention is to provide an active noise reduction system that can reduce the calculation load on the controller during the updates of filters. Further, another object of the present invention is to contribute to the development of sustainable transportation systems.

To achieve such an object, one aspect of the present invention provides an active noise reduction system (1, 81, 91, 101, and 111) comprising: a canceling sound output device (21 and S1 to Sn) configured to output a canceling sound for canceling a noise; an error microphone (23 and M1 to Mm) configured to generate an error signal (e1) based on the noise and the canceling sound; and a controller (25, 83, 93, and 115) configured to control the canceling sound output device based on the error signal, wherein the controller includes: a control signal generation unit (31, 85, and 120) including a control filter (W1) configured to generate a control signal (u1) for controlling the canceling sound output device; and a sound field learning unit (32, 86, and 121) including a secondary path filter (C^1) that represents an estimation value of a transfer function of a secondary path from the canceling sound output device to the error microphone, the control filter and the secondary path filter are configured to be adaptively updated, and the controller is configured to differentiate a timing of an adaptive update of the control filter and a timing of an adaptive update of the secondary path filter.

According to this aspect, as compared with a case where the adaptive update of the control filter and the adaptive update of the secondary path filter are performed simultaneously, it is possible to reduce the calculation load on the controller during the updates of these filters. Accordingly, the controller does not need to be composed of an expensive processor, so that the increase in the manufacturing cost of the active noise reduction system can be suppressed.

In the above aspect, preferably, the controller is configured to alternately perform the adaptive update of the control filter and the adaptive update of the secondary path filter.

According to this aspect, it is possible to prevent the adaptive update of either one of the control filter or the secondary path filter from being stopped for a long period.

In the above aspect, preferably, the control signal generation unit further includes an auxiliary secondary path filter (C^1*p*) that represents the estimation value of the transfer function of the secondary path, and the controller is configured to determine whether a fluctuation of the secondary path filter according to the adaptive update thereof has converged, and update the auxiliary secondary path filter by copying a value of the secondary path filter to the auxiliary secondary path filter in a case where the fluctuation of the secondary path filter according to the adaptive update thereof has converged.

According to this aspect, the update of the auxiliary secondary path filter is stopped until the fluctuation of the secondary path filter converges. Accordingly, it is possible to prevent the auxiliary secondary path filter from being updated based on a fluctuating secondary path filter. Accordingly, the control filter can converge quickly when the control filter is adaptively updated based on the auxiliary secondary path filter.

In the above aspect, preferably, the controller is configured to determine whether the fluctuation of the secondary path filter according to the adaptive update thereof has converged based on a variation in at least one of an amplitude of the secondary path filter and a phase of the secondary path filter.

According to the above aspect, it is possible to directly determine whether the fluctuation of the secondary path filter has converged based on the state of the secondary path filter. Accordingly, it is possible to accurately determine whether the fluctuation of the secondary path filter has converged as compared with the case of indirectly determining whether the fluctuation of the secondary path filter has converged based on the signal (for example, the error signal) related to the secondary path filter.

In the above aspect, preferably, one of the canceling sound output device and the error microphone is installed in an occupant seat (5) of a vehicle (3), another of the canceling sound output device and the error microphone is installed in a portion of the vehicle other than the occupant seat, and the controller is configured to determine whether a fluctuation of the secondary path filter according to the adaptive update thereof has converged, stop the adaptive update of the secondary path filter in a case where the fluctuation of the secondary path filter according to the adaptive update thereof has converged, determine whether the transfer function of the secondary path has changed based on a state of the occupant seat in a state where the adaptive update of the secondary path filter is stopped, and resume the adaptive update of the secondary path filter in a case where the transfer function of the secondary path has changed.

According to this aspect, in a case where the fluctuation of the secondary path filter has converged, it is possible to reduce the calculation load on the controller by stopping the adaptive update of the secondary path filter. Accordingly, it is possible to increase the speed of the adaptive update of the control filter. Further, even if the adaptive update of the secondary path filter is stopped (that is, even if the fluctuation of the secondary path filter is stopped), it is possible to resume the adaptive update of the secondary path filter at an appropriate timing by determining whether the transfer function of the secondary path has changed based on the state of the occupant seat.

In the above aspect, preferably, the controller is configured to acquire a plurality of variations among a variation in a front-and-rear position of the occupant seat, a variation in a height of the occupant seat, and a variation in an inclination angle of a reclining portion (8) of the occupant seat, set a first threshold and a second threshold for each of the plurality of variations, the second threshold being smaller than the first threshold, and determine that the transfer function of the secondary path has changed in a case where at least one of the plurality of variations is greater than the first threshold and a case where all of the plurality of variations are greater than the second threshold.

The transfer function of the secondary path may change significantly not only in a case where at least one of the plurality of variations changes significantly but also in a case where all of the plurality of variations change slightly. According to the above aspect, by taking into consideration both of these two cases, it is possible to accurately determine whether the transfer function of the secondary path has changed.

In the above aspect, preferably, at least one of the canceling sound output device and the error microphone is installed in a vehicle cabin (4) of a vehicle, and the controller is configured to determine whether a fluctuation of the secondary path filter according to the adaptive update thereof has converged, stop the adaptive update of the secondary path filter in a case where the fluctuation of the secondary path filter according to the adaptive update thereof has converged, determine whether the transfer function of the secondary path has changed based on an open/close state of a window (96) of the vehicle cabin in a state where the adaptive update of the secondary path filter is stopped, and resume the adaptive update of the secondary path filter in a case where the transfer function of the secondary path has changed.

According to this aspect, in a case where the fluctuation of the secondary path filter has converged, it is possible to reduce the calculation load on the controller by stopping the adaptive update of the secondary path filter. Accordingly, it is possible to increase the speed of the adaptive update of the control filter. Further, even if the adaptive update of the secondary path filter is stopped (that is, even if the fluctuation of the secondary path filter is stopped), it is possible to resume the adaptive update of the secondary path filter at an appropriate timing by determining whether the transfer function of the secondary path has changed based on the open/close state of the window.

In the above aspect, preferably, the sound field learning unit further includes a primary path filter ($\hat{H}$1) that represents an estimation value of a transfer function of a primary path from a noise source to the error microphone, the primary path filter is configured to be adaptively updated, and the controller is configured to normalize an adaptive update amount of the secondary path filter and an adaptive update amount of the primary path filter using a common normalization divisor.

Even if one of the secondary path filter or the primary path filter approaches convergence, the convergence thereof may be delayed due to the influence of the fluctuation of the other. According to the above aspect, the adaptive update amount of the secondary path filter and the adaptive update amount of the primary path filter are normalized using the common normalization divisor. Accordingly, it is possible to suppress the variation between the convergence speed of the secondary path filter and the convergence speed of the primary path filter. Accordingly, it is possible to prevent the convergence of one of the secondary path filter and the primary path filter from being delayed due to the fluctuation of the other, and to cause the secondary path filter and the primary path filter to converge quickly.

In the above aspect, preferably, the primary path filter is configured to be adaptively updated based on a reference signal corresponding to the noise, the secondary path filter is configured to be adaptively updated based on the control signal, and the common normalization divisor includes a norm of a signal vector of the reference signal and a norm of a signal vector of the control signal.

While the initial value of the control signal is zero, the initial value of the reference signal has a certain magnitude (i.e., the initial value of the reference signal is not zero). Accordingly, if the adaptive update amount of the secondary path filter is normalized based on the control signal and the adaptive update amount of the primary path filter is normalized based on the reference signal, a large difference may be caused between the adaptive update amounts of these two filters in an early stage of convergence. According to the above aspect, both the adaptive update amount of the secondary path filter and the adaptive update amount of the primary path filter are normalized based on the reference signal and the control signal. Accordingly, it is possible to prevent a large difference from being caused between the adaptive update amounts of these two filters in an early stage of convergence. Accordingly, it is possible to cause the secondary path filter and the primary path filter to converge more quickly.

In the above aspect, preferably, the active noise reduction system further comprises a reference microphone (24) provided separately from the error microphone, the reference microphone is configured to generate a determination signal (e2) based on at least the noise, the controller is configured to determine whether a fluctuation of the secondary path filter according to the adaptive update thereof has converged, stop the adaptive update of the secondary path filter in a case where the fluctuation of the secondary path filter according to the adaptive update thereof has converged, determine whether the transfer function of the secondary path has changed based on the error signal and the determination signal in a state where the adaptive update of the secondary path filter is stopped, and resume the adaptive update of the secondary path filter in a case where the transfer function of the secondary path has changed.

According to this aspect, in a case where the fluctuation of the secondary path filter has converged, it is possible to reduce the calculation load on the controller by stopping the adaptive update of the secondary path filter. Accordingly, it is possible to increase the speed of the adaptive update of the control filter. Further, even if the adaptive update of the secondary path filter is stopped (that is, even if the fluctuation of the secondary path filter is stopped), it is possible to resume the adaptive update of the secondary path filter at an appropriate timing by determining whether the transfer function of the secondary path has changed based on the error signal and the determination signal. Furthermore, by determining whether the transfer function of the secondary path has changed based on the error signal and the determination signal, it is possible to determine whether the transfer function of the secondary path has changed without using a sensor that detects an external state of the controller (for example, a state of an occupant seat).

In the above aspect, preferably, the controller includes a second control signal generation unit (33) that is provided separately from the control signal generation unit, and a microphone corresponding to the second control signal generation unit is used as the reference microphone.

According to this aspect, by using the microphone corresponding to the second control signal generation unit as the reference microphone, it is not necessary to provide a dedicated reference microphone for generating the determination signal. Accordingly, it is possible to suppress an increase in the number of components.

In the above aspect, preferably, the controller is configured to determine that the transfer function of the secondary path has changed in a case where a difference between the error signal and the determination signal is equal to or greater than a first reference value and a temporal variation in the error signal is equal to or greater than a second reference value.

According to this aspect, it is possible to determine whether the transfer function of the secondary path has changed based on not only the difference between the error signal and the determination signal but also the temporal variation in the error signal. Accordingly, it is possible to avoid erroneously determining that the transfer function of the secondary path from the canceling sound output device to the error microphone has changed even though the transfer function of the secondary path from the canceling sound output device to the reference microphone has changed. Further, it is possible to easily determine whether the transfer function of the secondary path has changed based on the difference between the error signal and the determination signal and the temporal variation in the error signal. Accordingly, it is possible to reduce the calculation load on the controller as compared with the case of determining whether the transfer function of the secondary path has changed based on the similarity between the error signal and the determination signal.

In the above aspect, preferably, the controller is configured to determine that the transfer function of the secondary path has changed in a case where the difference between the error signal and the determination signal is equal to or greater than the first reference value, the temporal variation in the error signal is equal to or greater than the second reference value, and the error signal is equal to or greater than a third reference value.

Even in a state where the transfer function of the secondary path does not change, the error signal may change slightly. In the case of determining the change in the transfer function of the secondary path using only the first reference value and the second reference value, the second reference value needs to be increased to eliminate the above-mentioned slight change in the error signal. However, if the second reference value is increased in this way, the accuracy of determining the change in the transfer function of the secondary path may decrease. According to the above aspect, it is possible to eliminate the above-mentioned slight change in the error signal without increasing the second reference value by determining the change in the transfer function of the secondary path using the third reference value in addition to the first reference value and the second reference value. Accordingly, it is possible to determine the change in the transfer function of the secondary path with high accuracy.

In the above aspect, preferably, the controller includes a plurality of control channels (Ch1 to ChS) each including the control signal generation unit and the sound field learning unit, and the controller is configured to differentiate the timing of the adaptive update of the secondary path filter in each of the control channels.

According to this aspect, as compared with a case where the adaptive update of the secondary path filter in each of the control channels are performed simultaneously, it is possible to reduce the calculation amount of the controller during the updates of these filters. Accordingly, the controller does not need to be composed of an expensive processor, so that the increase in the manufacturing cost of the active noise reduction system can be suppressed.

To achieve such an object, another aspect of the present invention provides an active noise reduction system (111) comprising: a canceling sound output device (S1 to Sn) configured to output a canceling sound for canceling a noise; an error microphone (M1 to Mm) configured to generate an error signal (e) based on the noise and the canceling sound; and a controller (115) configured to control the canceling sound output device based on the error signal, wherein the controller includes: a control signal generation unit (120) including a control filter (W) configured to generate a control signal (u) for controlling the canceling sound output device; and a sound field learning unit (121) including a secondary path filter ($\hat{C}$) that represents an estimation value of a transfer function of a secondary path from the canceling sound output device to the error microphone, the control filter and the secondary path filter are configured to be adaptively updated, the controller includes a plurality of control channels (Ch1 to ChS) each including the control signal generation unit and the sound field learning unit, and the controller is configured to differentiate a timing of an adaptive update of the secondary path filter in each of the control channels.

According to this aspect, as compared with a case where the adaptive update of the secondary path filter in each of the control channels are performed simultaneously, it is possible to reduce the calculation load on the controller during the updates of these filters. Accordingly, the controller does not need to be composed of an expensive processor, so that the increase in the manufacturing cost of the active noise reduction system can be suppressed.

Thus, according to the above aspects, it is possible to provide an active noise reduction system that can reduce the calculation load on the controller during the updates of filters.

BRIEF DESCRIPTION OF THE DRAWING(S)

FIG. 17 is an update process table according to the fifth embodiment;

DETAILED DESCRIPTION OF THE INVENTION

Figure 1:
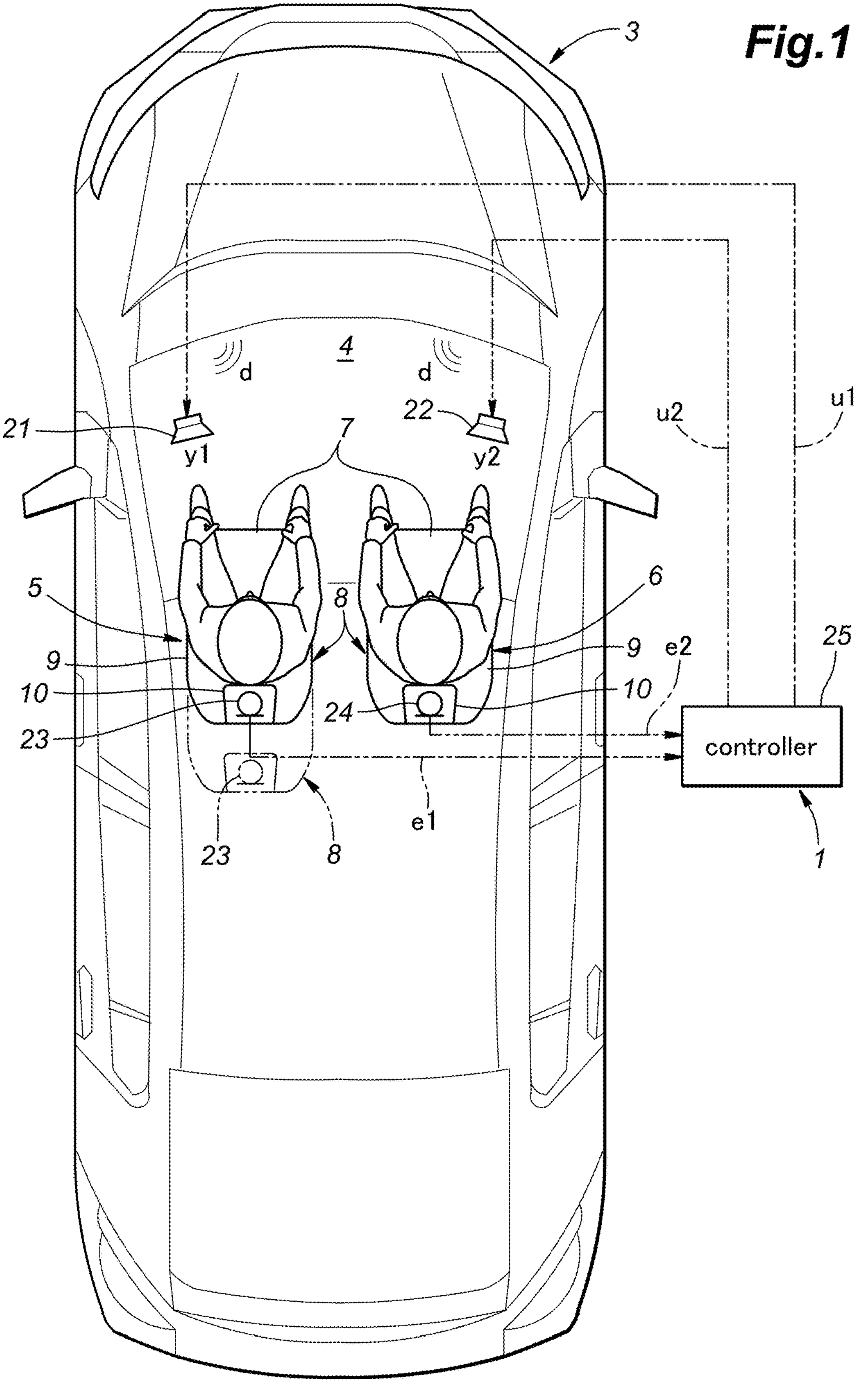
FIG. 1 is a schematic diagram showing a vehicle to which an active noise reduction system according to the first embodiment is applied.

In the following, embodiments of the present invention will be described with reference to the drawings. Note that in the following description, "^" (circumflex) added to various symbols indicates an identified value or an estimated value. "^" is added above each symbol in the drawings, but is added after each symbol in the description.

The First Embodiment

First, the first embodiment of the present invention will be described with reference to FIGS. 1 to 7.

<Vehicle 3>

FIG. 1 is a schematic diagram showing a vehicle 3 to which an active noise reduction system 1 (hereinafter referred to as "the noise reduction system 1") according to the first embodiment is applied. The vehicle 3 is, for example, a four-wheeled automobile.

Inside a vehicle cabin 4 of the vehicle 3, a plurality of occupant seats 5, 6 is arranged. The plurality of occupant seats 5, 6 includes a first occupant seat 5 and a second occupant seat 6. For example, the first occupant seat 5 is a passenger seat, and the second occupant seat 6 is a driver's seat. In another embodiment, a seat (for example, a driver's seat or a back seat) other than a passenger seat may be the first occupant seat 5, and a seat (for example, a passenger seat or a back seat) other than a driver's seat may be the second occupant seat 6. In other words, the combination of the first occupant seat 5 and the second occupant seat 6 can be freely determined.

Each occupant seat 5, 6 (hereinafter simply referred to as "the occupant seat 5, 6") includes a seat cushion 7 and a reclining portion 8 arranged above and behind the seat cushion 7 and configured to rotate relative to the seat cushion 7. The reclining portion 8 includes a seat back 9 and a headrest 10 fixed to an upper end of the seat back 9.

The front-and-rear position of the occupant seat 5, 6, the height of the occupant seat 5, 6, and the inclination angle of the reclining portion 8 of the occupant seat 5, 6 are adjusted by an electric motor (not shown) according to an operation on a seat position operation unit (not shown) by the occupant. In other words, the occupant seat 5, 6 is the so-called power seat.

<Noise Reduction System 1>

The noise reduction system 1 is an Active Noise Control device (ANC device) configured to reduce a noise d generated inside the vehicle cabin 4 of the vehicle 3. More specifically, the noise reduction system 1 reduces the noise d by generating canceling sounds y1, y2 that are in an opposite phase to the noise d and causing the generated canceling sounds y1, y2 to interfere with the noise d.

For example, the noise d to be reduced by the noise reduction system 1 is a road noise caused by the vibrations of wheels due to the force from a road surface. The noise d to be reduced by the noise reduction system 1 may be a noise (for example, a drive noise caused by the vibrations of a drive source such as an internal combustion engine and an electric motor) other than the above-mentioned road noise.

The noise reduction system 1 includes a plurality of speakers 21, 22 configured to output the canceling sounds y1, y2 for canceling the noise d, a plurality of microphones 23, 24 configured to generate error signals e1, e2 based on the noise d and the canceling sounds y1, y2, and a controller 25 configured to control the plurality of speakers 21, 22 based on the error signals e1, e2.

<The Plurality of Speakers 21, 22>

The plurality of speakers 21, 22 includes a first speaker 21 (an example of a canceling sound output device) configured to output the canceling sound y1, and a second speaker 22 (an example of a second canceling sound output device) configured to output the canceling sound y2. The second speaker 22 is provided separately from the first speaker 21.

The first speaker 21 is arranged at a position corresponding to the first occupant seat 5 but installed in a portion other than the first occupant seat 5. For example, the first speaker 21 is installed on a floor in front of the first occupant seat 5 or in a door on a lateral side of the first occupant seat 5. In another embodiment, the first speaker 21 may be installed in the first occupant seat 5.

The second speaker 22 is arranged at a position corresponding to the second occupant seat 6 but installed in a portion other than the second occupant seat 6. For example, the second speaker 22 is installed on a floor in front of the second occupant seat 6 or in a door on a lateral side of the second occupant seat 6. In another embodiment, the second speaker 22 may be installed in the second occupant seat 6.

<The Plurality of Microphones 23, 24>

The plurality of microphones 23, 24 includes a first microphone 23 (an example of an error microphone) and a second microphone 24 (an example of a reference microphone). The second microphone 24 is provided separately from the first microphone 23.

The first microphone 23 is installed in a freely-selected portion of the first occupant seat 5. For example, the first microphone 23 is installed in the headrest 10 of the reclining portion 8 of the first occupant seat 5. In another embodiment, the first microphone 23 may be arranged at a position corresponding to the first occupant seat 5 but installed in a portion other than the first occupant seat 5.

Figure 2:
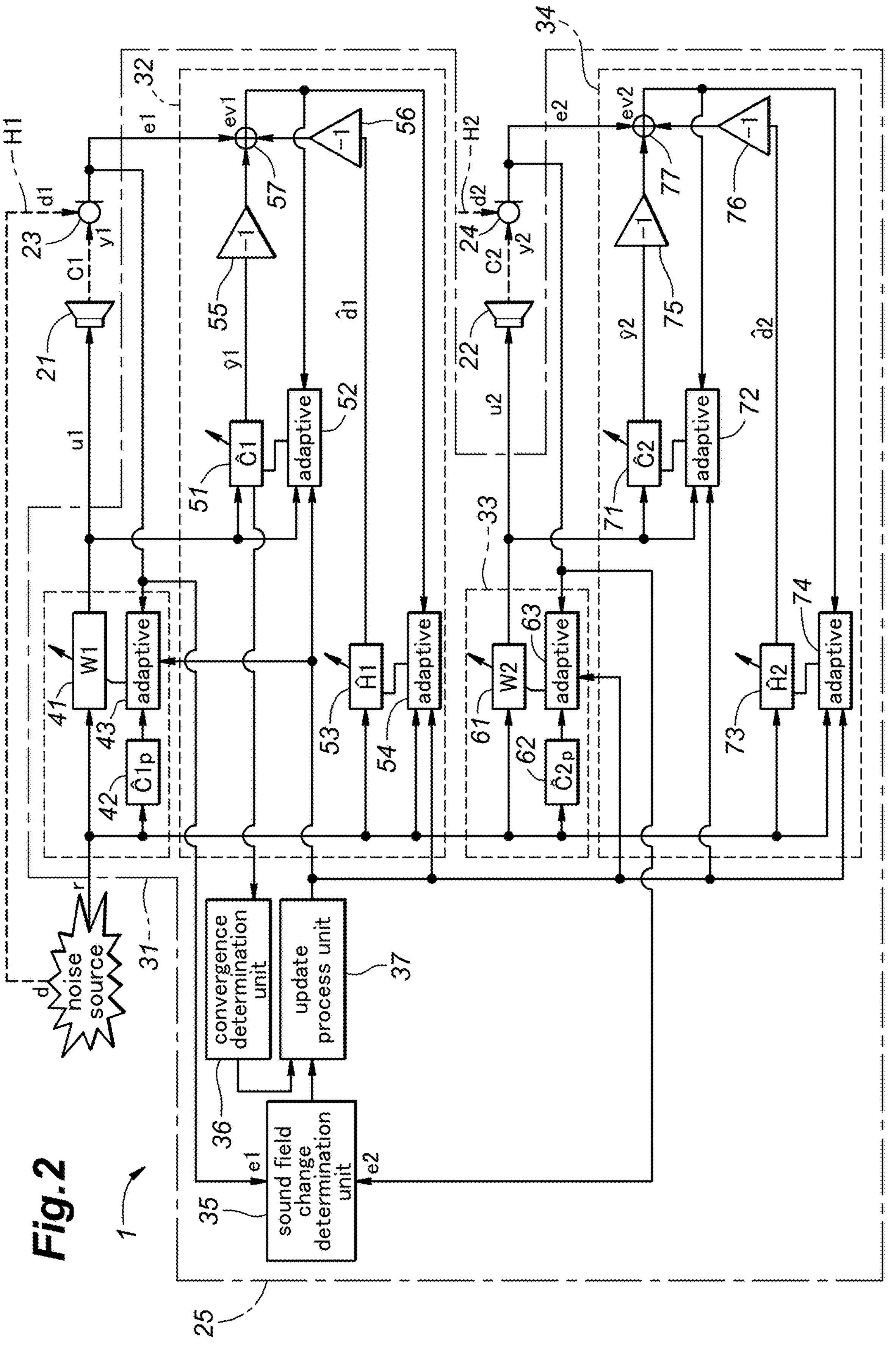
FIG. 2 is a functional block diagram showing the active noise reduction system according to the first embodiment.

With reference to FIG. 2, the first microphone 23 is configured to generate the error signal e1 based on the canceling sound y1, the canceling sound y2, and a noise d1 (the noise d at the position of the first microphone 23). In another embodiment, the first microphone 23 may be configured to generate the error signal e1 based only on the canceling sound y1 and the noise d1.

With reference to FIG. 1, the second microphone 24 is installed in a freely-selected portion of the second occupant seat 6. For example, the second microphone 24 is installed in the headrest 10 of the reclining portion 8 of the second occupant seat 6. In another embodiment, the second microphone 24 may be arranged at a position corresponding to the second occupant seat 6 but installed in a portion other than the second occupant seat 6.

With reference to FIG. 2, the second microphone 24 is configured to generate the error signal e2 (an example of a determination signal) based on the canceling sound y1, the canceling sound y2, and a noise d2 (the noise d at the position of the second microphone 24). In another embodiment, the second microphone 24 may be configured to generate the error signal e2 based only on the canceling sound y2 and the noise d2.

"C1" in FIG. 2 represents a transfer function of a secondary path from the first speaker 21 to the first microphone 23, and "H1" in FIG. 2 represents a transfer function of a primary path from a noise source to the first microphone 23. Similarly, "C2" in FIG. 2 represents a transfer function of a secondary path from the second speaker 22 to the second microphone 24, and "H2" in FIG. 2 represents a transfer function of a primary path from the noise source to the second microphone 24. These transfer functions C1, H1, C2, and H2 correspond to a sound field inside the vehicle cabin 4.

<Controller 25>

The controller 25 is composed of a computer including an arithmetic processing unit (a processor such as a CPU, an MPU, etc.) and a storage device (a memory such as a ROM, a RAM, etc.). The controller 25 may be configured as one piece of hardware or may be configured as a unit including multiple pieces of hardware.

A reference signal r corresponding to the noise d is input to the controller 25. The reference signal r is input to the controller 25, for example, from a reference microphone (not shown) that generates the reference signal r from the noise d. In another embodiment, the reference signal r may be input to the controller 25 from a vibration sensor (not shown) that detects the vibrations corresponding to the noise d, or from a component other than the reference microphone or the vibration sensor.

With reference to FIG. 2, the controller 25 includes, as functional components, a first control signal generation unit 31, a first sound field learning unit 32, a second control signal generation unit 33, a second sound field learning unit 34, a sound field change determination unit 35, a convergence determination unit 36, and an update process unit 37. The first control signal generation unit 31 and the first sound field learning unit 32 correspond to the first speaker 21 and the first microphone 23. The second control signal generation unit 33 and the second sound field learning unit 34 correspond to the second speaker 22 and the second microphone 24.

<First Control Signal Generation Unit 31>

The first control signal generation unit 31 of the controller 25 includes a first control filter unit 41, a first auxiliary secondary path filter unit 42, and a first control update unit 43.

The first control filter unit 41 includes a control filter W1. The control filter W1 is composed of a finite impulse response filter (FIR filter). In another embodiment, the control filter W1 may be composed of a single-frequency adaptive notch filter (SAN filter) and the like.

As the control filter W1 of the first control filter unit 41 filters the reference signal r, the first control filter unit 41 generates a control signal u1 for controlling the first speaker 21. The first control filter unit 41 outputs the generated control signal u1 to the first speaker 21 and the first sound field learning unit 32. Accordingly, the first speaker 21 generates the canceling sound y1 according to the control signal u1 output from the first control filter unit 41.

The first auxiliary secondary path filter unit 42 includes an auxiliary secondary path filter $\hat{C}\mathbf{1}p$. The auxiliary secondary path filter $\hat{C}\mathbf{1}p$ is a filter that represents an estimation value of the transfer function C1 of the secondary path. The auxiliary secondary path filter $\hat{C}\mathbf{1}p$ is composed of an FIR filter. In another embodiment, the auxiliary secondary path filter $\hat{C}\mathbf{1}p$ may be composed of a SAN filter and the like.

As the auxiliary secondary path filter $\hat{C}\mathbf{1}p$ of the first auxiliary secondary path filter unit 42 filters the reference signal r, the first auxiliary secondary path filter unit 42 corrects the reference signal r. The first auxiliary secondary path filter unit 42 outputs the corrected reference signal r to the first control update unit 43.

The first control update unit 43 adaptively updates the control filter W1 using an adaptive algorithm such as a least mean square algorithm (LMS algorithm). More specifically, the first control update unit 43 adaptively updates the control filter W1 such that the error signal e1 output from the first microphone 23 is minimized.

<First Sound Field Learning Unit 32>

The first sound field learning unit 32 of the controller 25 includes a first canceling sound estimation signal generation unit 51, a first secondary path update unit 52, a first noise estimation signal generation unit 53, a first primary path update unit 54, a first canceling sound estimation signal reversing unit 55, a first noise estimation signal reversing unit 56, and a first virtual error signal generation unit 57.

The first canceling sound estimation signal generation unit 51 includes a secondary path filter $\hat{C}\mathbf{1}$. The secondary path filter $\hat{C}\mathbf{1}$, similar to the auxiliary secondary path filter $\hat{C}\mathbf{1}p$, is a filter that represents the estimation value of the transfer function C1 of the secondary path. The secondary path filter $\hat{C}\mathbf{1}$ is composed of, for example, an FIR filter. In another embodiment, the secondary path filter $\hat{C}\mathbf{1}$ may be composed of a SAN filter and the like.

As the secondary path filter $\hat{C}\mathbf{1}$ of the first canceling sound estimation signal generation unit 51 filters the control signal u1, the first canceling sound estimation signal generation unit 51 generates a canceling sound estimation signal $\hat{y}\mathbf{1}$ that represents an estimation value of the canceling sound y1. The first canceling sound estimation signal generation unit 51 outputs the generated canceling sound estimation signal $\hat{y}\mathbf{1}$ to the first canceling sound estimation signal reversing unit 55.

The first secondary path update unit 52 adaptively updates the secondary path filter $\hat{C}\mathbf{1}$ using an adaptive algorithm such as the LMS algorithm. More specifically, the first secondary path update unit 52 adaptively updates the secondary path filter $\hat{C}\mathbf{1}$ such that a virtual error signal ev1 (which will be described later) output from the first virtual error signal generation unit 57 is minimized.

The first noise estimation signal generation unit 53 includes a primary path filter $\hat{H}\mathbf{1}$. The primary path filter $\hat{H}\mathbf{1}$ is a filter that represents an estimation value of the transfer function H1 of the primary path. The primary path filter $\hat{H}\mathbf{1}$ is composed of, for example, an FIR filter. In another embodiment, the primary path filter H^1 may be composed of a SAN filter and the like.

As the primary path filter H^1 of the first noise estimation signal generation unit 53 filters the reference signal r, the first noise estimation signal generation unit 53 generates a noise estimation signal d^1 that represents an estimation value of the noise d1. The first noise estimation signal generation unit 53 outputs the generated noise estimation signal d^1 to the first noise estimation signal reversing unit 56.

The first primary path update unit 54 adaptively updates the primary path filter H^1 using an adaptive algorithm such as the LMS algorithm. More specifically, the first primary path update unit 54 adaptively updates the primary path filter H^1 such that the virtual error signal ev1 (which will be described later) output from the first virtual error signal generation unit 57 is minimized.

The first canceling sound estimation signal reversing unit 55 reverses the polarity of the canceling sound estimation signal y^1 output from the first canceling sound estimation signal generation unit 51. The first canceling sound estimation signal reversing unit 55 outputs the canceling sound estimation signal y^1 the polarity of which is reversed to the first virtual error signal generation unit 57.

The first noise estimation signal reversing unit 56 reverses the polarity of the noise estimation signal d^1 output from the first noise estimation signal generation unit 53. The first noise estimation signal reversing unit 56 outputs the noise estimation signal d^1 the polarity of which is reversed to the first virtual error signal generation unit 57.

The first virtual error signal generation unit 57 generates the virtual error signal ev1 by adding the error signal e1 output from the first microphone 23, the canceling sound estimation signal y^1 that has passed through the first canceling sound estimation signal reversing unit 55, and the noise estimation signal d^1 that has passed through the first noise estimation signal reversing unit 56. The first virtual error signal generation unit 57 outputs the generated virtual error signal ev1 to the first secondary path update unit 52 and the first primary path update unit 54.

<Second Control Signal Generation Unit 33>

The second control signal generation unit 33 of the controller 25 is provided separately from the first control signal generation unit 31. The second control signal generation unit 33 includes a second control filter unit 61, a second auxiliary secondary path filter unit 62, and a second control update unit 63.

As a control filter W2 (an example of a second control filter) of the second control filter unit 61 filters the reference signal r, the second control filter unit 61 generates a control signal u2 (an example of a second control signal) for controlling the second speaker 22. The second auxiliary secondary path filter unit 62 includes an auxiliary secondary path filter C^2$p$ that represents an estimation value of the transfer function C2 of the secondary path. The auxiliary secondary path filter C^2$p$ corrects the reference signal r, and the second auxiliary secondary path filter unit 62 outputs the corrected reference signal r to the second control update unit 63. The second control update unit 63 adaptively updates the control filter W2 such that the error signal e2 output from the second microphone 24 is minimized.

<Second Sound Field Learning Unit 34>

The second sound field learning unit 34 of the controller 25 is provided separately from the first sound field learning unit 32. The second sound field learning unit 34 includes a second canceling sound estimation signal generation unit 71, a second secondary path update unit 72, a second noise estimation signal generation unit 73, a second primary path update unit 74, a second canceling sound estimation signal reversing unit 75, a second noise estimation signal reversing unit 76, and a second virtual error signal generation unit 77.

The second canceling sound estimation signal generation unit 71 includes a secondary path filter C^2 (an example of a second secondary path filter) that represents an estimation value of the transfer function C2 of the secondary path. As the secondary path filter C^2 filters the control signal u2, the second canceling sound estimation signal generation unit 71 generates a canceling sound estimation signal y^2 that represents an estimation value of the canceling sound y2. The second secondary path update unit 72 adaptively updates the secondary path filter C^2 such that a virtual error signal ev2 (which will be described later) is minimized.

The second noise estimation signal generation unit 73 includes a primary path filter H^2 that represents an estimation value of the transfer function H2 of the primary path. As the primary path filter H^2 filters the reference signal r, the second noise estimation signal generation unit 73 generates a noise estimation signal d^2 that represents an estimation value of the noise d2. The second primary path update unit 74 adaptively updates the primary path filter H^2 such that the virtual error signal ev2 (which will be described later) is minimized.

The second canceling sound estimation signal reversing unit 75 reverses the polarity of the canceling sound estimation signal y^2. The second noise estimation signal reversing unit 76 reverses the polarity of the noise estimation signal d^2. The second virtual error signal generation unit 77 generates the virtual error signal ev2 by adding the error signal e2 output from the second microphone 24, the canceling sound estimation signal y^2 that has passed through the second canceling sound estimation signal reversing unit 75, and the noise estimation signal d^2 that has passed through the second noise estimation signal reversing unit 76.

<Sound Field Change Determination Unit 35>

The sound field change determination unit 35 of the controller 25 determines whether the transfer function C1 of the secondary path has changed based on the error signal e1 and the error signal e2. The determination method of the sound field change determination unit 35 will be described later.

<Convergence Determination Unit 36>

The convergence determination unit 36 of the controller 25 determines whether the fluctuation of the secondary path filter C^1 according to the adaptive update thereof has converged based on the secondary path filter C^1. The determination method of the convergence determination unit 36 will be described later.

<Update Process Unit 37>

The update process unit 37 of the controller 25 determines the order and timing of the adaptive updates of the filters based on the determination results of the sound field change determination unit 35 and the convergence determination unit 36. The determination method of the update process unit 37 will be described later.

<Sound Field Change Determination Process>

Next, a sound field change determination process performed by the sound field change determination unit 35 will be described. The sound field change determination process is a process for determining whether the transfer function C1 of the secondary path has changed.

Figure 3:
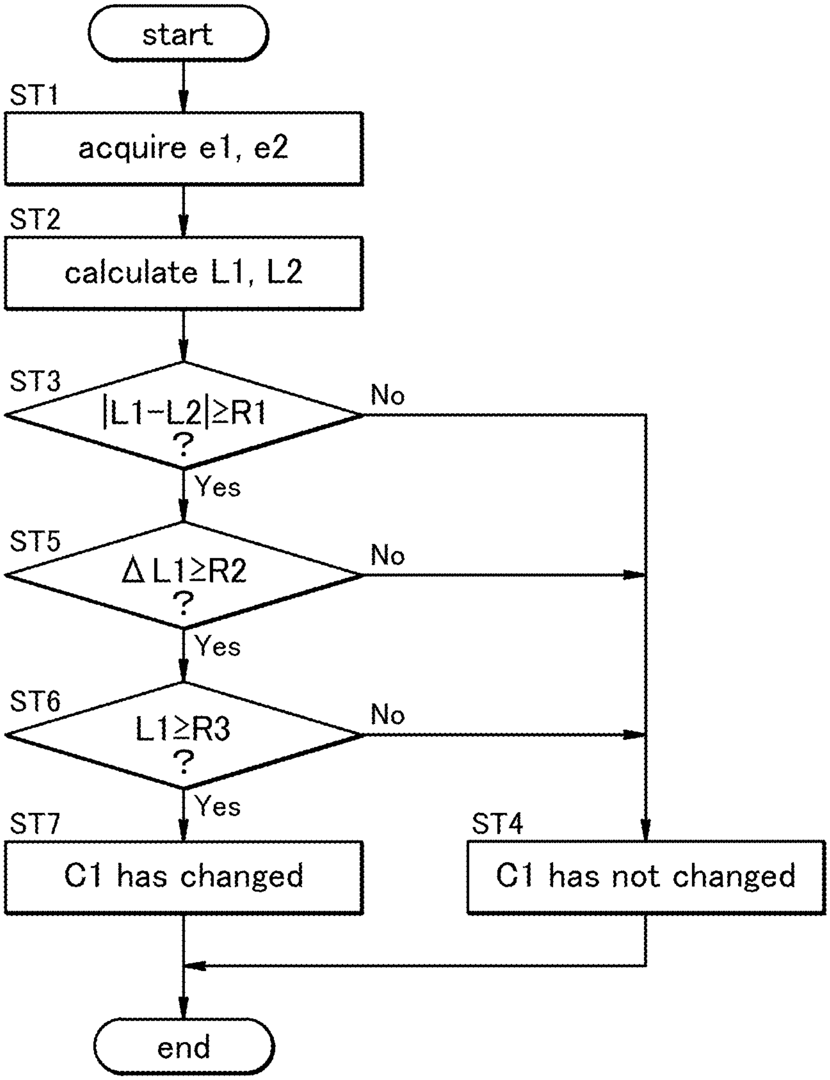
FIG. 3 is a flowchart showing a sound field change determination process according to the first embodiment.

With reference to FIG. 3, when the sound field change determination process starts, the sound field change determination unit 35 acquires the error signal e1 from the first microphone 23 and acquires the error signal e2 from the second microphone 24 (step ST1).

Next, the sound field change determination unit 35 calculates a signal level L1 of the error signal e1 and a signal level L2 of the error signal e2 (step ST2). For example, the sound field change determination unit 35 may determine the sum of the squares of the error signal e1 within a certain period as the signal level L1 of the error signal e1, or determine the sum of the absolute values of the error signal e1 within a certain period as the signal level L1 of the error signal e1. The same method can be applied to the signal level L2 of the error signal e2.

Next, the sound field change determination unit 35 determines whether the absolute value of the difference between the signal level L1 of the error signal e1 and the signal level L2 of the error signal e2 is equal to or more than a first reference value R1 (step ST3). In a case where the absolute value of the difference between the signal level L1 of the error signal e1 and the signal level L2 of the error signal e2 is less than the first reference value R1 (step ST3: No), the sound field change determination unit 35 determines that the transfer function C1 of the secondary path has not changed (step ST4).

In a case where the absolute value of the difference between the signal level L1 of the error signal e1 and the signal level L2 of the error signal e2 is equal to or greater than the first reference value R1 (step ST3: Yes), the sound field change determination unit 35 determines whether a temporal variation ΔL1 of the signal level L1 of the error signal e1 (for example, the difference between the current value of the signal level L1 of the error signal e1 and the previous value of the signal level L1 of the error signal e1) is equal to or greater than a second reference value R2 (step ST5). In a case where the temporal variation ΔL1 of the signal level L1 of the error signal e1 is less than the second reference value R2 (step ST5: No), the sound field change determination unit 35 determines that the transfer function C1 of the secondary path has not changed (step ST4).

In a case where the temporal variation ΔL1 of the signal level L1 of the error signal e1 is equal to or greater than the second reference value R2 (step ST5: Yes), the sound field change determination unit 35 determines whether the signal level L1 of the error signal e1 is equal to or greater than a third reference value R3 (step ST6). In a case where the signal level L1 of the error signal e1 is less than the third reference value R3 (step ST6: No), the sound field change determination unit 35 determines that the transfer function C1 of the secondary path has not changed (step ST4). In a case where the signal level L1 of the error signal e1 is equal to or greater than the third reference value R3 (step ST6: Yes), the sound field change determination unit 35 determines that the transfer function C1 of the secondary path has changed (step ST7).

As shown by a two-dot chain line in FIG. 1, when the reclining portion 8 of the first occupant seat 5 is reclined, the position of the first microphone 23 installed in the reclining portion 8 of the first occupant seat 5 changes. Accordingly, the transfer function C1 of the secondary path changes, and the difference between the transfer function C1 of the secondary path and the secondary path filter C^1 temporarily increases. Accordingly, the control effect of the noise reduction system 1 temporarily decreases, and the signal level L1 of the error signal e1 increases.

Figure 4:
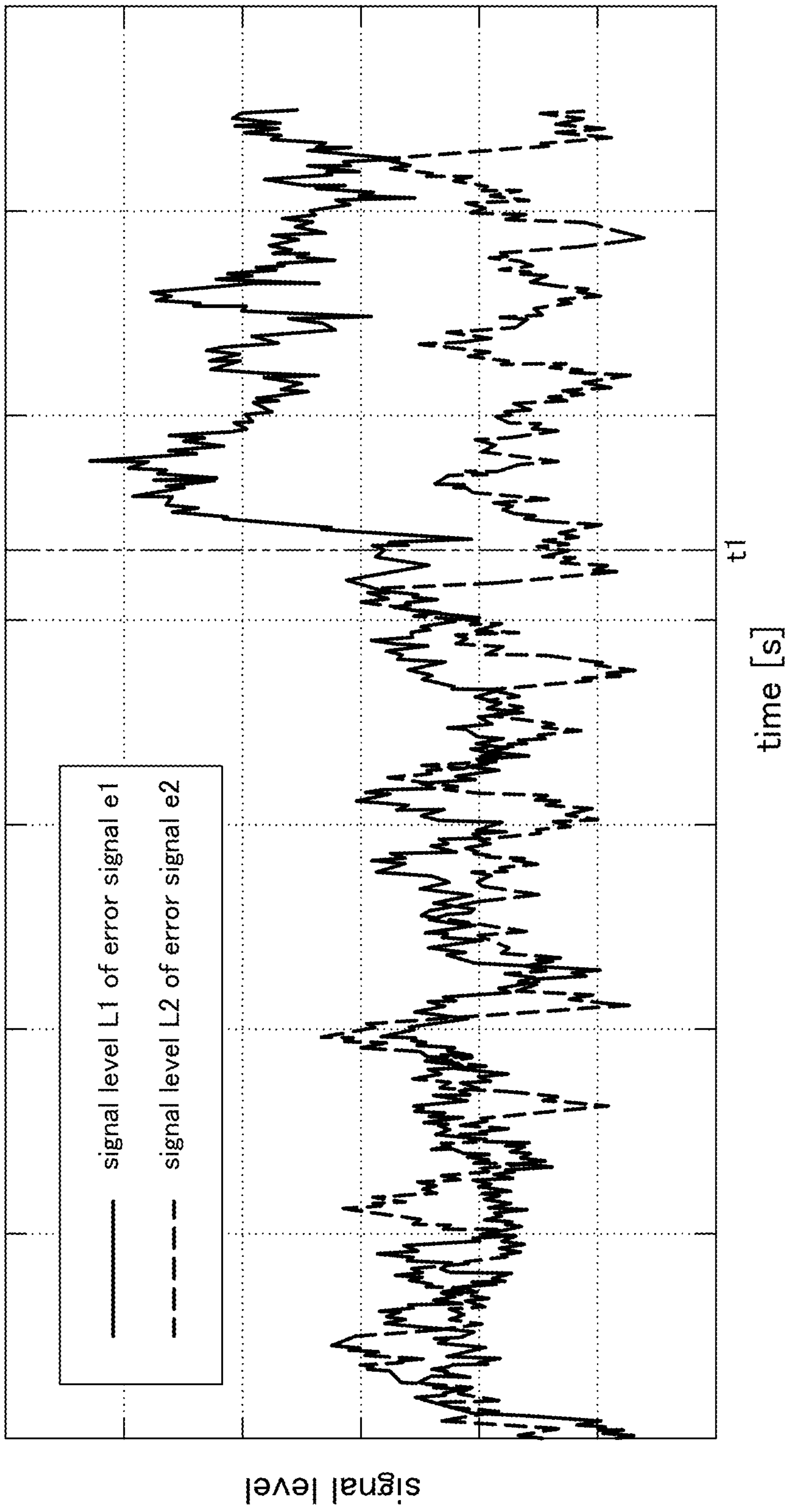
FIG. 4 is a graph showing a signal level of an error signal according to the first embodiment.

With reference to FIG. 4, for example, when the reclining portion 8 of the first occupant seat 5 is reclined at time T1, the signal level L1 of the error signal e1 increases significantly relative to the signal level L2 of the error signal e2. Accordingly, all of the determinations in steps ST3, ST5, and ST6 become "Yes". Accordingly, the sound field change determination unit 35 can determine that the transfer function C1 of the secondary path has changed.

Further, the sound field change determination unit 35 can determine whether the transfer function C2 of the secondary path has changed by a process similar to the above-mentioned sound field change determination process based on the error signal e1 and the error signal e2. For example, the sound field change determination unit 35 determines that the transfer function C2 of the secondary path has changed in a case where the absolute value of the difference between the signal level L1 of the error signal e1 and the signal level L2 of the error signal e2 is equal to or greater than the first reference value R1, the temporal variation ΔL2 of the signal level L2 of the error signal e2 is equal to or greater than the second reference value R2, and the signal level L2 of the error signal e2 is equal to or greater than the third reference value R3. Otherwise, the sound field change determination unit 35 determines that the transfer function C2 of the secondary path has not changed.

<Convergence Determination Process>

Next, the convergence determination process performed by the convergence determination unit 36 will be described. The convergence determination process is a process for determining whether the fluctuation of the secondary path filter C^1 according to the adaptive update thereof (hereinafter, referred to as "the fluctuation of the secondary path filter C^1") has converged.

Figure 5:
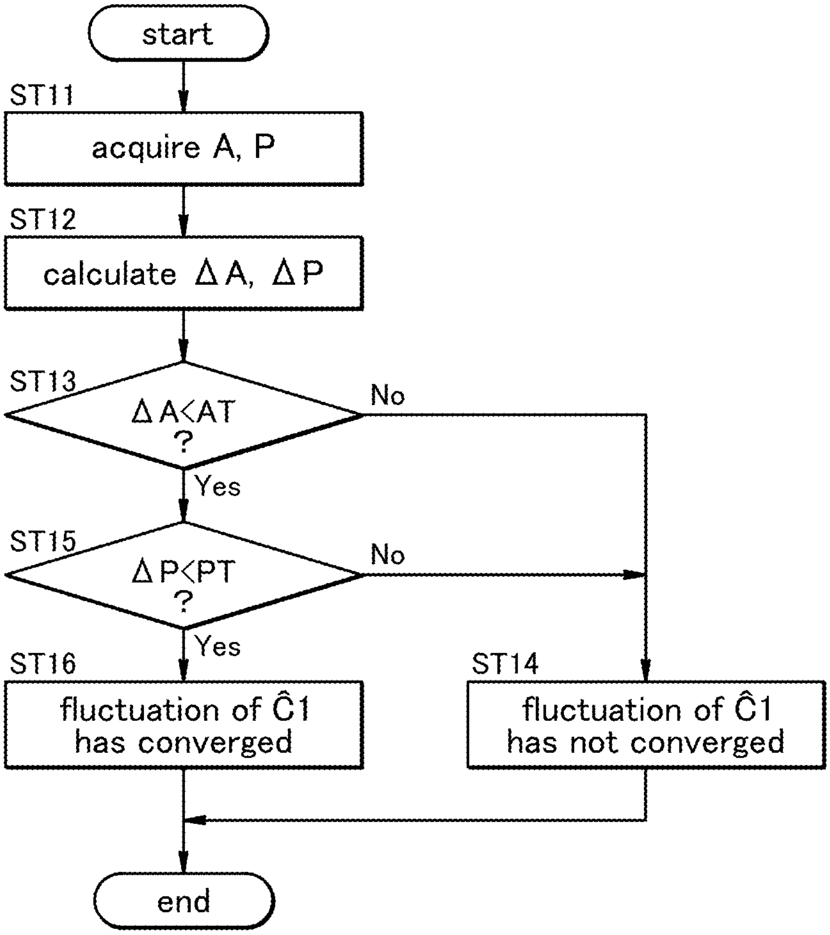
FIG. 5 is a flowchart showing a convergence determination process according to the first embodiment.
Figure 6:
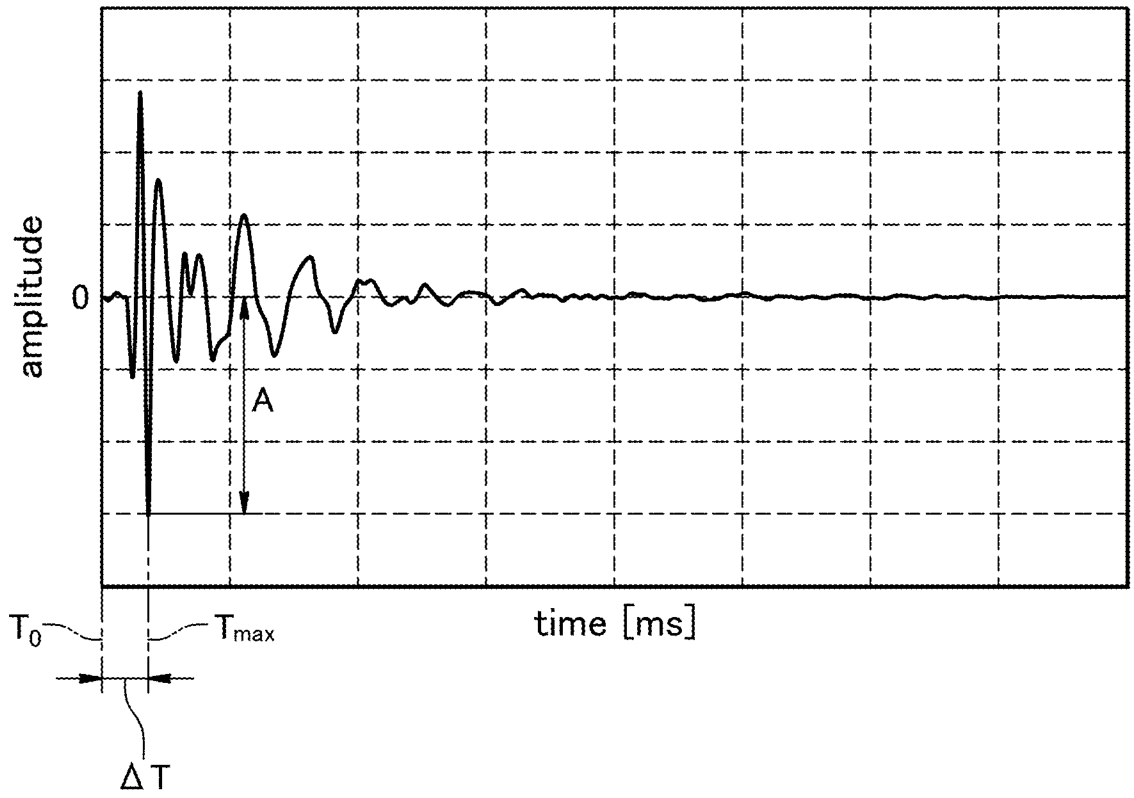
FIG. 6 is a graph showing an impulse response of a secondary path filter according to the first embodiment.

With reference to FIGS. 5 and 6, when the convergence determination process starts, the convergence determination unit 36 acquires an amplitude A and a phase P of the secondary path filter C^1 (step ST11). For example, the convergence determination unit 36 acquires the maximum value of the amplitude of the impulse response of the secondary path filter C^1 as the amplitude A of the secondary path filter C^1. Further, the convergence determination unit 36 acquires a delay sample number Sd, which corresponds to the maximum value of the amplitude of the impulse response of the secondary path filter C^1, as the phase P of the secondary path filter C^1. A delay time ΔT (the time from a time $T_0$ when the first speaker 21 outputs the canceling sound y1 to a time $T_{max}$ when the amplitude of the impulse response of the secondary path filter C^1 becomes maximum) is calculated by multiplying the delay sample number Sd by a sampling time Ts. That is, the convergence determination unit 36 uses the delay sample number Sd corresponding to the delay time ΔT as the phase P of the secondary path filter C^1.

Next, the convergence determination unit 36 calculates the variation ΔA of the amplitude A of the secondary path filter C^1 (for example, the difference between the current value of the amplitude A of the secondary path filter C^1 and the previous value of the amplitude A of the secondary path filter C^1). Furthermore, the convergence determination unit 36 calculates the variation ΔP of the phase P of the secondary path filter C^1 (for example, the difference between the current value of the phase P of the secondary path filter C^1 and the previous value of the phase P of the secondary path filter C^1) (step ST12).

Next, the convergence determination unit 36 determines whether the variation ΔA of the amplitude A of the secondary path filter C^1 is less than an amplitude threshold AT (step ST13). In a case where the variation ΔA of the amplitude A of the secondary path filter C^1 is equal to or greater than the amplitude threshold AT (step ST13: No), the convergence determination unit 36 determines that the fluctuation of the secondary path filter C^1 has not converged (step ST14).

In a case where the variation ΔA of the amplitude A of the secondary path filter C^1 is less than the amplitude threshold AT (step ST13: Yes), the convergence determination unit 36 determines whether the variation ΔP of the phase P of the secondary path filter C^1 is less than a phase threshold PT (step ST15). In a case where the variation ΔP of the phase P of the secondary path filter C^1 is equal to or greater than the phase threshold PT (step ST15: No), the convergence determination unit 36 determines that the fluctuation of the secondary path filter C^1 has not converged (step ST14). In a case where the variation ΔP of the phase P of the secondary path filter C^1 is less than the phase threshold PT (step ST15: Yes), the convergence determination unit 36 determines that the fluctuation of the secondary path filter C^1 has converged (step ST16).

As described above, the convergence determination unit 36 performs the convergence determination process based on both the variation ΔA of the amplitude A and the variation ΔP of the phase P of the secondary path filter C^1. Accordingly, it is possible to accurately determine whether the fluctuation of the secondary path filter C^1 has converged as compared with a case where the convergence determination process is performed based on only one of the variation ΔA of the amplitude A and the variation ΔP of the phase P of the secondary path filter C^1.

<Update Process>

Next, an update process performed by the controller 25 will be described. The update process is a process for updating the control filter W1, the secondary path filter C^1, the primary path filter H^1, and the auxiliary secondary path filter C^1*p*.

Figure 7:
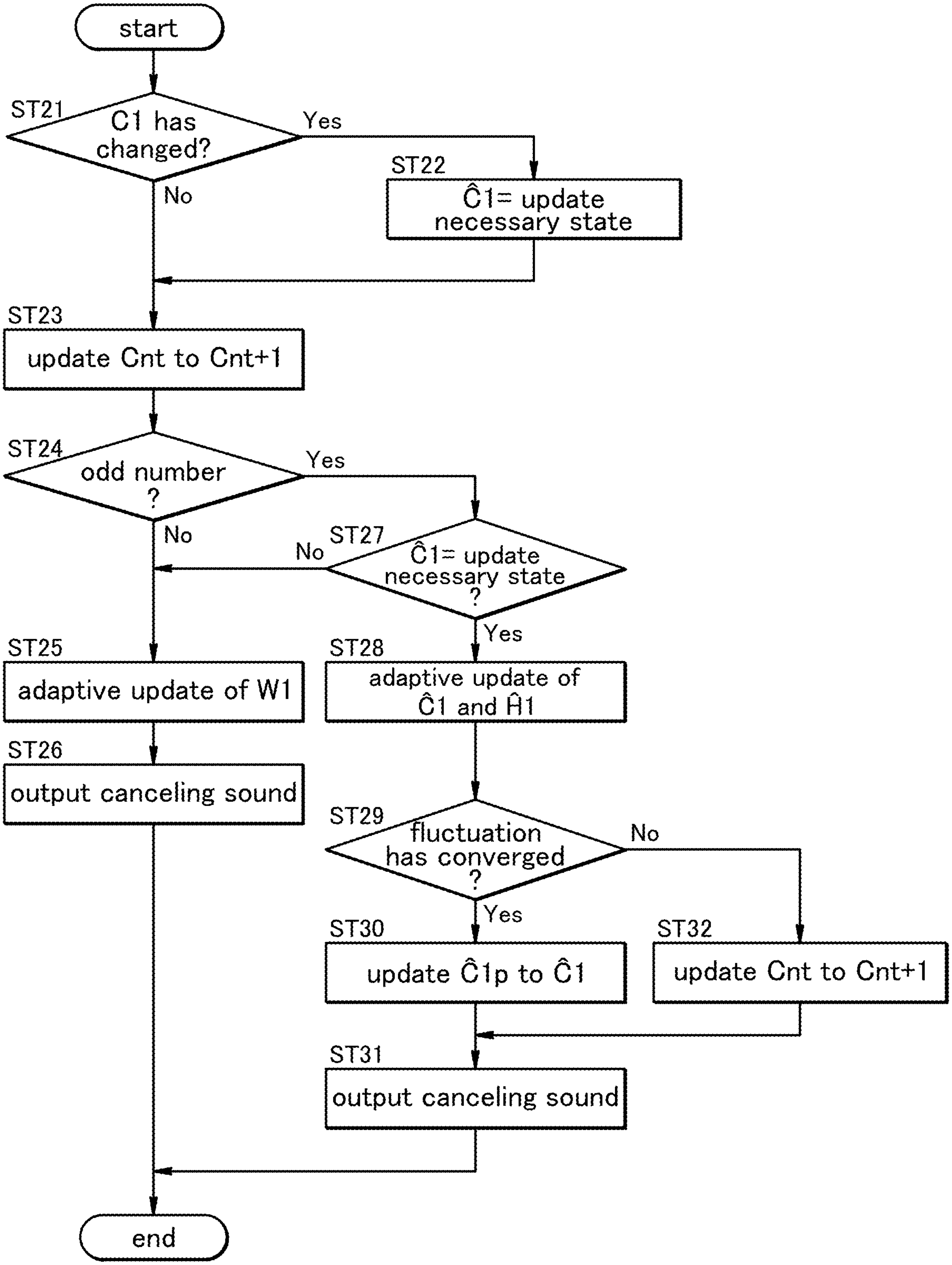
FIG. 7 is a flowchart showing an update process according to the first embodiment.

With reference to FIG. 7, when the update process starts, the sound field change determination unit 35 performs the above-mentioned sound field change determination process. That is, the sound field change determination unit 35 determines whether the transfer function C1 of the secondary path has changed based on the error signal e1 and the error signal e2 (step ST21).

In a case where the transfer function C1 of the secondary path has changed (step ST21: Yes), the update process unit 37 sets the state of the secondary path filter C^1 to an update necessary state (step ST22), and proceeds to step ST23. In a case where the transfer function C1 of the secondary path has not changed (step ST21: No), the update process unit 37 proceeds to step ST23 without executing the process of step ST22.

Next, the update process unit 37 updates the number of times Cnt (initial value=0) of the update process to Cnt+1 (step ST23), and determines whether the number of times Cnt is an odd number (step ST24).

In a case where the number of times Cnt is an even number (step ST24: No), the first control update unit 43 adaptively updates the control filter W1 (step ST25). Next, the first control filter unit 41 generates the control signal u1 using the adaptively updated control filter W1, and outputs the generated control signal u1 to the first speaker 21. Accordingly, the first speaker 21 outputs the canceling sound y1 (step ST26).

In a case where the number of times Cnt is an odd number (step ST24: Yes), the update process unit 37 determines whether the state of the secondary path filter C^1 is set to the update necessary state (step ST27). In a case where the state of the secondary path filter C^1 is not set to the update necessary state (step ST27: No), the processes of steps ST25 and ST26 are performed in the same manner as a case where the number of times Cnt is an even number (step ST24: No).

In a case where the state of the secondary path filter C^1 is set to the update necessary state (step ST27: Yes), the first secondary path update unit 52 adaptively updates the secondary path filter C^1, and the first primary path update unit 54 adaptively updates the primary path filter H^1 (step ST28).

Next, the convergence determination unit 36 performs the above-mentioned convergence determination process to determine whether the fluctuation of the secondary path filter C^1 has converged (step ST29).

In a case where the fluctuation of the secondary path filter C^1 has converged (step ST29: Yes), the update process unit 37 updates the auxiliary secondary path filter C^1*p* to the value of the secondary path filter C^1 by copying the value of the secondary path filter C^1 to the auxiliary secondary path filter C^1*p* (step ST30).

Next, the first control filter unit 41 generates the control signal u1 using the temporarily fixed control filter W1 (the control filter W1 adaptively updated in the previous update process), and outputs the generated control signal u1 to the first speaker 21. Accordingly, the first speaker 21 outputs the canceling sound y1 (step ST31).

In a case where the fluctuation of the secondary path filter C^1 has not converged (step ST29: No), the update process unit 37 updates the number of times Cnt to Cnt+1 without updating the auxiliary secondary path filter C^1*p* to the value of the secondary path filter C^1 (step ST32). Next, as the above-mentioned step ST31 is performed, the first control filter unit 41 outputs the control signal u1 to the first speaker 21, and the first speaker 21 outputs the canceling sound y1.

As either step ST26 or step ST31 ends, the update process ends, and a next update process (new update process) is performed after a prescribed time. However, the value of the number of times Cnt is maintained even after the end of the update process, and is used for the next update process.

In a case where the fluctuation of the secondary path filter C^1 has not converged in the current update process (step ST29: No), the update process unit 37 sets the state of the secondary path filter C^1 to the update necessary state in the next update process (step ST22). Further, in a case where the fluctuation of the secondary path filter C^1 has not converged in the current update process (step ST29: No), as the number of times Cnt is updated twice in step ST32 of the current update process and step ST23 of the next update process, step ST24 of the next update process becomes "Yes". Accordingly, in the next update process, the secondary path filter C^1 is adaptively updated (step ST28) and whether the fluctuation of the secondary path filter C^1 has converged is determined (step ST29) in the same manner as in the current update process. In this way, in the present embodiment, the adaptive update of the secondary path filter C^1 and the determination of whether the fluctuation of the secondary path filter C^1 has converged are repeated without the adaptive update of the control filter W1 until the fluctuation of the secondary path filter C^1 converges.

The controller 25 repeatedly performs the above-mentioned update process at prescribed time intervals. In the update process, the controller 25 determines whether the fluctuation of the secondary path filter C^1 has converged (step ST29). In a case where the fluctuation of the secondary path filter C^1 has converged (step ST29: Yes), the controller 25 stops the adaptive update of the secondary path filter C^1. In the next update process, the controller 25 determines whether the transfer function C1 of the secondary path has changed based on the error signal e1 and the error signal e2 in a state where the adaptive update of the secondary path filter C^1 is stopped (step ST21). In a case where the transfer function C1 of the secondary path has changed (step ST21: Yes), the controller 25 resumes the adaptive update of the secondary path filter C^1 (steps ST22, ST27, and ST28).

<The Adaptive Update of the Secondary Path Filter C^1 and the Primary Path Filter H^1>

In step ST28 of the above-mentioned update process, the first secondary path update unit 52 adaptively updates the secondary path filter C^1 according to the following formula (1), and the first primary path update unit 54 adaptively updates the primary path filter H^1 according to the following formula (2). In the following formula (1), "u1" represents a weighting coefficient (step size parameter) for adjusting the adaptive update amount of the secondary path filter C^1. In the following formula (2), "u2" represents a weighting coefficient (step size parameter) for adjusting the adaptive update amount of the primary path filter H^1. In the following formulae (1) and (2), "N" represents a normalization divisor for normalizing the adaptive update amount of the secondary path filter C^1 and the primary path filter H^1.

$$\hat{C}1(t+1) = \hat{C}1(t) + \frac{\mu_1}{N} ev1(t)u1(t) \tag{1}$$

$$\hat{H}1(t+1) = \hat{H}1(t) + \frac{\mu_2}{N} ev1(t)r(t) \tag{2}$$

As is clear from the above formula (1), the secondary path filter C^1 is adaptively updated based on the control signal u1, and the primary path filter H^1 is adaptively updated based on the reference signal r. Further, as is clear from the above formulae (1) and (2), the adaptive update amount of the secondary path filter C^1 and the adaptive update amount of the primary path filter H^1 are normalized by a common normalization divisor N. The normalization divisor N is represented by the following formula (3). In the following formula (3), "$\|r(t)\|$" represents a norm of a signal vector of the reference signal r, and "$\|u\mathbf{1}(t)\|$" represents a norm of a signal vector of the control signal u1. Further, in the following formula (3), "σ" represents a constant (small positive number) for preventing the normalization divisor N from becoming zero.

$$N = \|r(t)\| + \|u1(t)\| + \sigma \tag{3}$$

"$\|r(t)\|$" and "$\|u\mathbf{1}(t)\|$" in the above formula (3) are represented by the following formulae (4) and (5), respectively. In the following formula (4), "L1" represents the number of data of the signal vector of the reference signal r. In the following formula (5), "L2" represents the number of data of the signal vector of the control signal u1.

$$\|r(t)\| = \sum_{i=1}^{L1} r_i(t)^2 \tag{4}$$

$$\|u1(t)\| = \sum_{i=1}^{L2} u1_i(t)^2 \tag{5}$$

Effects

In the above-mentioned update process, the controller 25 prohibits the adaptive update of the control filter W1 and the adaptive update of the secondary path filter C^1 from being performed simultaneously in one update process. In other words, the controller 25 differentiates the timing of the adaptive update of the control filter W1 and the timing of the adaptive update of the secondary path filter C^1. Accordingly, as compared with a case where the adaptive updates of the control filter W1 and the secondary path filter C^1 are performed simultaneously, it is possible to reduce the calculation load on the controller 25 during the updates of these filters. Accordingly, the controller 25 does not need to be composed of an expensive processor, so that the increase in the manufacturing cost of the noise reduction system 1 can be suppressed.

Furthermore, by differentiating the timing of the adaptive update of the control filter W1 and the timing of the adaptive update of the secondary path filter C^1, it is possible to prevent the control filter W1 from being adaptively updated based on the secondary path filter C^1 that is fluctuating according to the adaptive update thereof. Accordingly, it is possible to suppress the delay in the convergence of the control filter W1 and improve the noise reduction performance of the noise reduction system 1.

Further, in the above update process, in a case where the secondary path filter C^1 and the primary path filter H^1 are adaptively updated, the control filter W1 is not adaptively updated. Accordingly, as compared with a case where the adaptive update of the control filter W1 is performed in every update process, it is possible to reduce the calculation load on the controller 25.

Modifications

In the above first embodiment, the convergence determination unit 36 performs the convergence determination process based on both the variation ΔA of the amplitude A and the variation ΔP of the phase P of the secondary path filter C^1. In another embodiment, the convergence determination unit 36 may perform the convergence determination process based on only one of the variation ΔA of the amplitude A and the variation ΔP of the phase P of the secondary path filter C^1.

In the above first embodiment, the convergence determination unit 36 acquires the maximum value of the amplitude of the impulse response of the secondary path filter C^1 as the amplitude A of the secondary path filter C^1 (step ST11). In another embodiment, the convergence determination unit 36 may calculate the amplitude A of the secondary path filter C^1 by the following formula (6). In the following formula (6), "L" represents the total number of coefficients of the secondary path filter C^1, and "n" represents the number of the coefficient of the secondary path filter C^1.

$$A(t) = \sum_{n=1}^{L} |\hat{C}1(t)_n| \tag{6}$$

By using the above formula (6), the amplitude A of the secondary path filter C^1 can be calculated more accurately.

In the above first embodiment, the convergence determination unit 36 determines whether the variation ΔA of the amplitude A of the secondary path filter C^1 is less than the amplitude threshold AT (step ST13). In another embodiment, the convergence determination unit 36 may determine whether the state where the variation ΔA of the amplitude A of the secondary path filter C^1 is less than the amplitude threshold AT continues for a prescribed period. Alternatively, the convergence determination unit 36 may determine whether the ratio of the current value of the amplitude A of the secondary path filter C^1 to the previous value of the amplitude A of the secondary path filter C^1 is equal to or less than a prescribed value. The same method can be applied to the determination of the variation ΔP of the phase P of the secondary path filter C^1.

In the above first embodiment, the update process unit 37 copies the value of the secondary path filter C^1 to the auxiliary secondary path filter C^1*p* at a timing of the adaptive update of the secondary path filter C^1 (step ST28 to ST30). In another embodiment, the update process unit 37 may copy the value of the secondary path filter C^1 to the auxiliary secondary path filter C^1*p* at a timing different from the adaptive update of the secondary path filter C^1 (for example, at a timing of the adaptive update of the control filter W1).

Figure 8:
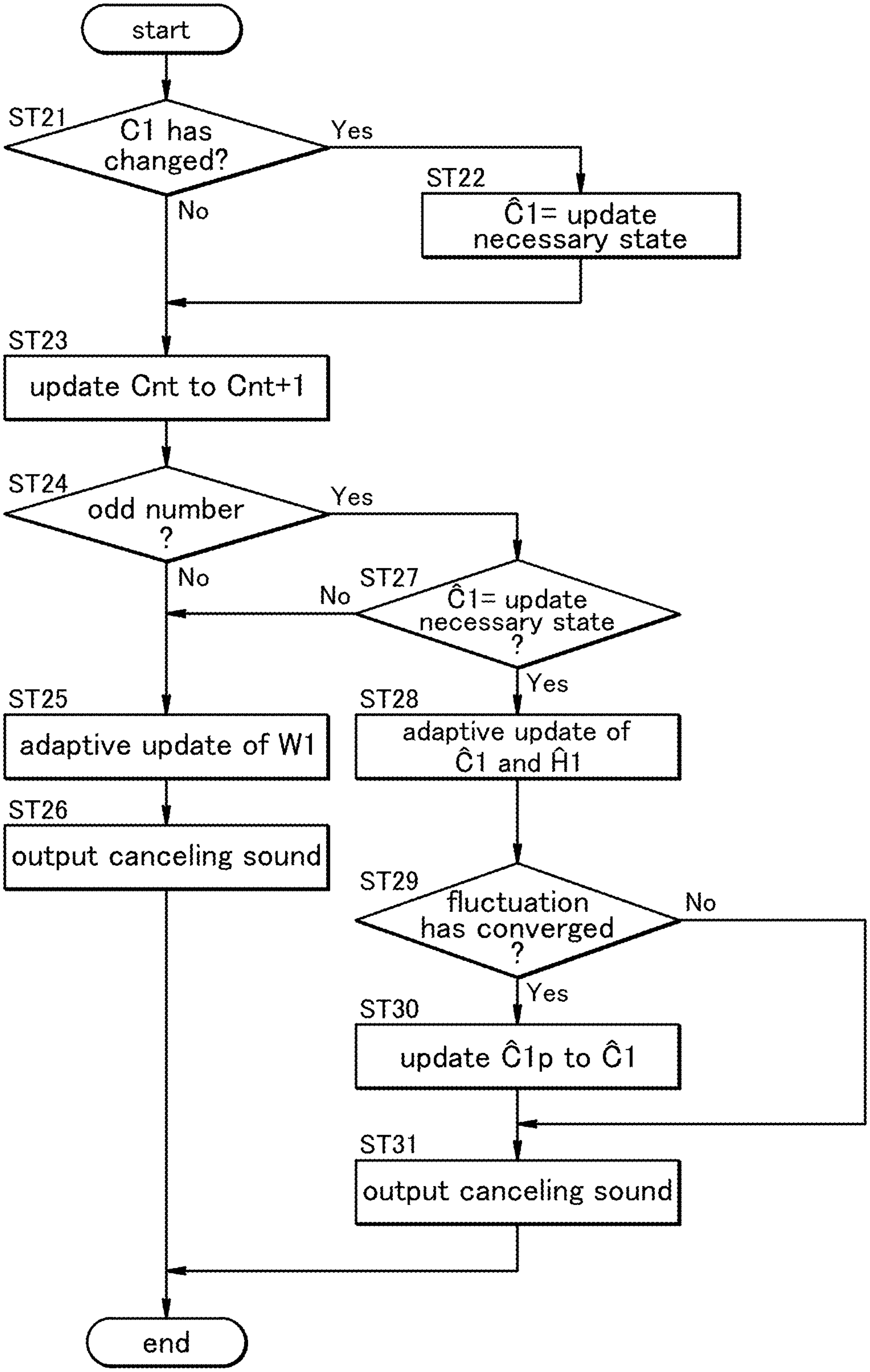
FIG. 8 is a flowchart showing an update process according to another embodiment.

With reference to FIG. 7, in the above first embodiment, in a case where the fluctuation of the secondary path filter C^1 has not converged (step ST29: No), the first speaker 21 outputs the canceling sound y1 after the update process unit 37 updates the number of times Cnt to Cnt+1 (steps ST31 and ST32). With reference to FIG. 8, in another embodiment, in a case where the fluctuation of the secondary path filter C^1 has not converged (step ST29: No), the first speaker 21 may output the canceling sound y1 without the update of the number of times Cnt to Cnt+1 by the update process unit 37 (step ST31). That is, in another embodiment, the process of step ST32 may be omitted. Accordingly, in the next update process, step ST24 becomes "No", and the control filter W1 is adaptively updated (step ST25). Accordingly, in a case where the transfer function C1 of the secondary path changes, the adaptive update of the control filter W1 (step ST25) and the adaptive update of the secondary path filter C^1 (step ST28) are performed alternately.

In the above first embodiment, the second microphone 24 is used as the reference microphone for generating the determination signal. In another embodiment, a dedicated reference microphone may be provided for generating the determination signal. In such a case, the reference microphone may generate the determination signal based only on the canceling sound y1 and the noise d. In other words, the reference microphone may generate the determination signal based on at least the noise d.

In the above first embodiment, the controller 25 performs the update process to adaptively update the control filter W1, the secondary path filter C^1, and the primary path filter H^1. In another embodiment, the controller 25 may perform the update process to adaptively update the control filter W2, the secondary path filter C^2, and the primary path filter H^2. In such a case, the second microphone 24 may be used as the error microphone and the first microphone 23 may be used as the reference microphone.

The Second Embodiment

Next, with reference to FIGS. 9 to 11, an active noise reduction system 81 (hereinafter referred to as "the noise reduction system 81") according to the second embodiment of the present invention will be described. The components other than a controller 83 are the same as those of the first embodiment. Accordingly, the same reference numerals as those in the first embodiment are given to these components in the drawings, and the descriptions thereof will be omitted.

<Controller 83>

Figure 9:
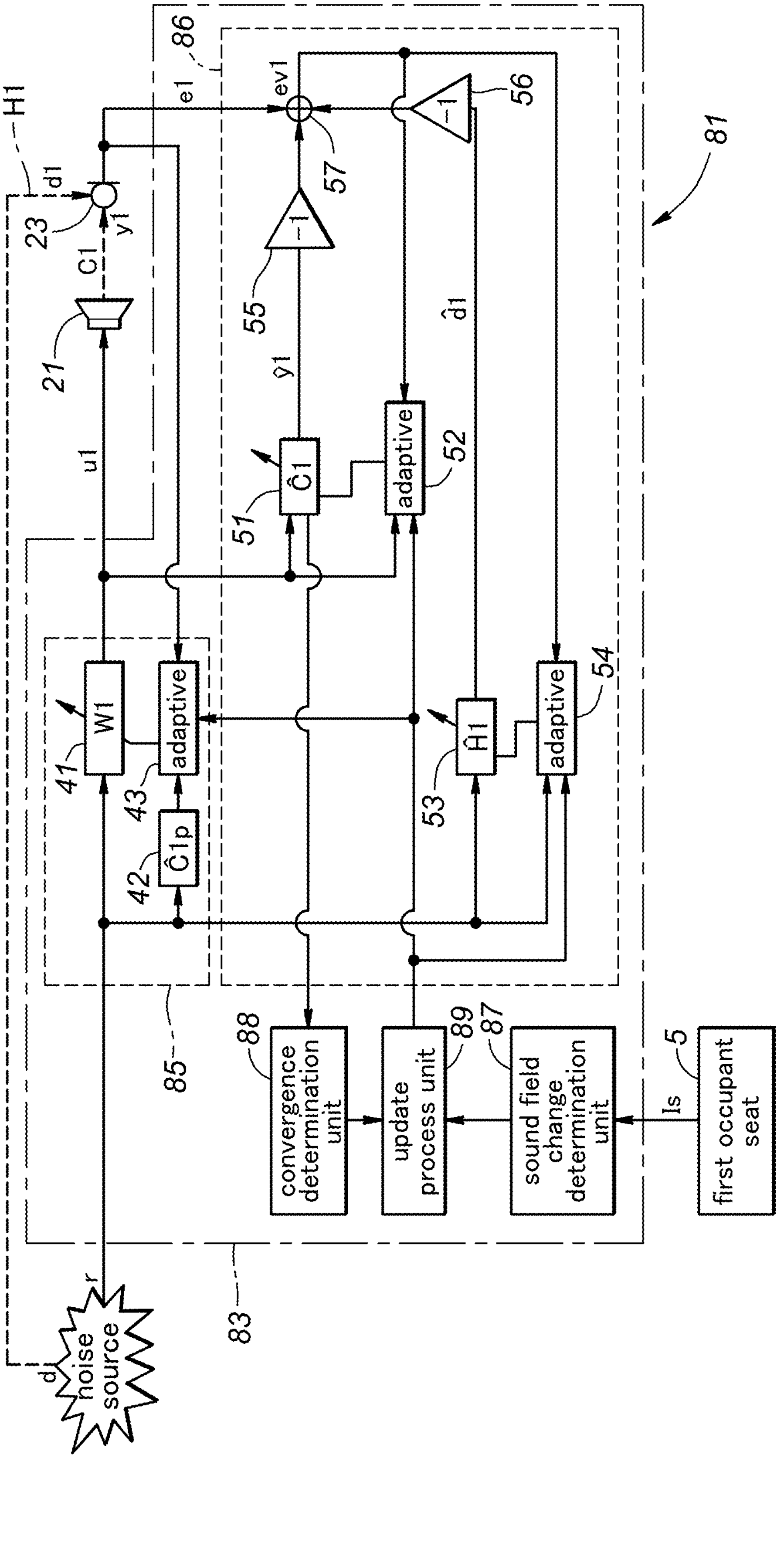
FIG. 9 is a functional block diagram showing an active noise reduction system according to the second embodiment.

With reference to FIG. 9, the controller 83 includes, as functional components, a control signal generation unit 85, a sound field learning unit 86, a sound field change determination unit 87, a convergence determination unit 88, and an update process unit 89. The configurations of the control signal generation unit 85, the sound field learning unit 86, the convergence determination unit 88, and the update process unit 89 are similar to those of the first control signal generation unit 31, the first sound field learning unit 32, the convergence determination unit 36, and the update process unit 37 according to the first embodiment, respectively. Accordingly, the descriptions thereof will be omitted.

<Sound Field Change Determination Unit 87>

Seat state information Is is transmitted from the first occupant seat 5 to the sound field change determination unit 87 of the controller 83. The seat state information Is is the information about the state of the first occupant seat 5. The seat state information Is includes the information about the front-and-rear position of the first occupant seat 5, the information about the height of the first occupant seat 5, and the information about the inclination angle of the reclining portion 8 of the first occupant seat 5 (hereinafter referred to as "the inclination angle of the first occupant seat 5").

<Sound Field Change Determination Process>

Next, a sound field change determination process performed by the sound field change determination unit 87 will be described. The sound field change determination process is a process for determining whether the transfer function C1 of the secondary path has changed. Hereinafter, the position of the first occupant seat 5 in the current seat state information Is will be referred to as "the current position Pc of the first occupant seat 5", and the position of the first occupant seat 5 in the previous seat state information Is will be referred to as "the reference position Pr of the first occupant seat 5".

Figure 10:
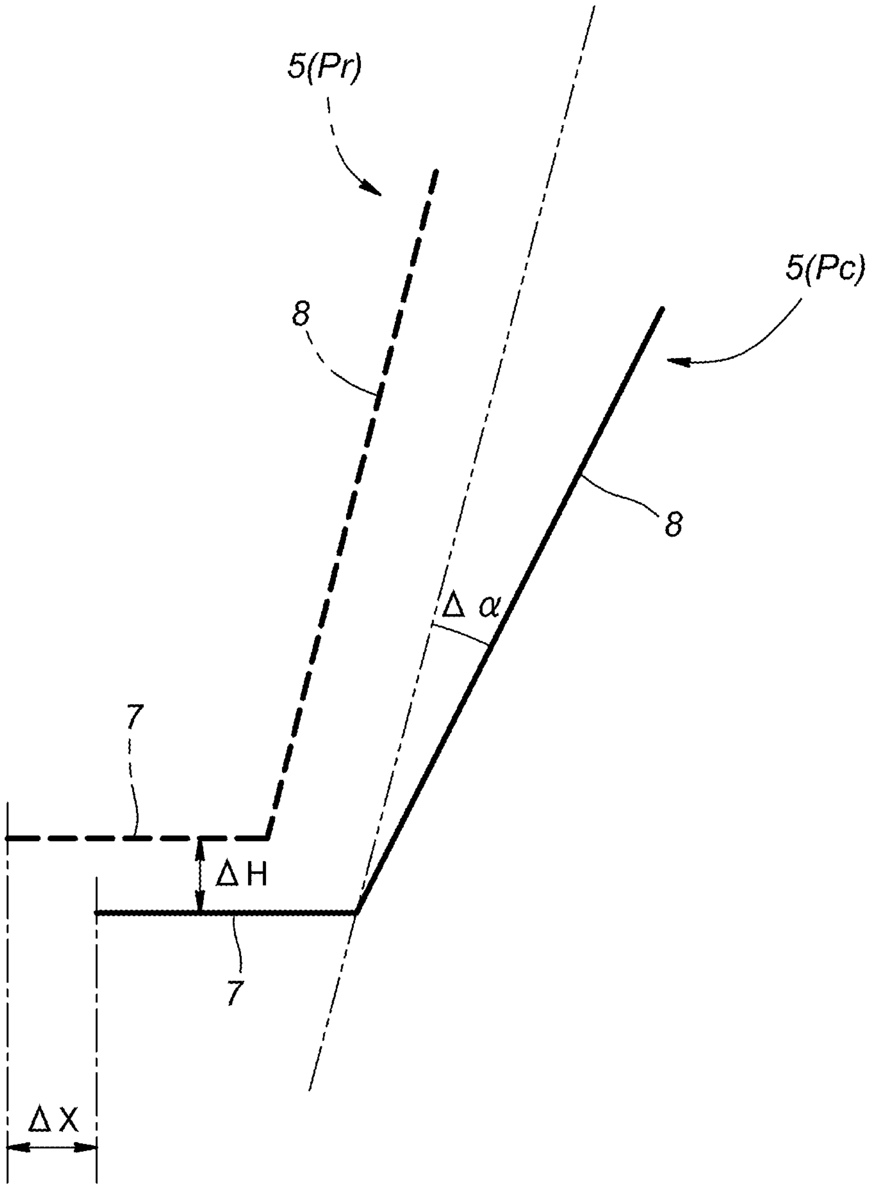
FIG. 10 is a schematic diagram showing a current position and a reference position of a first occupant seat according to the second embodiment.
Figure 11:
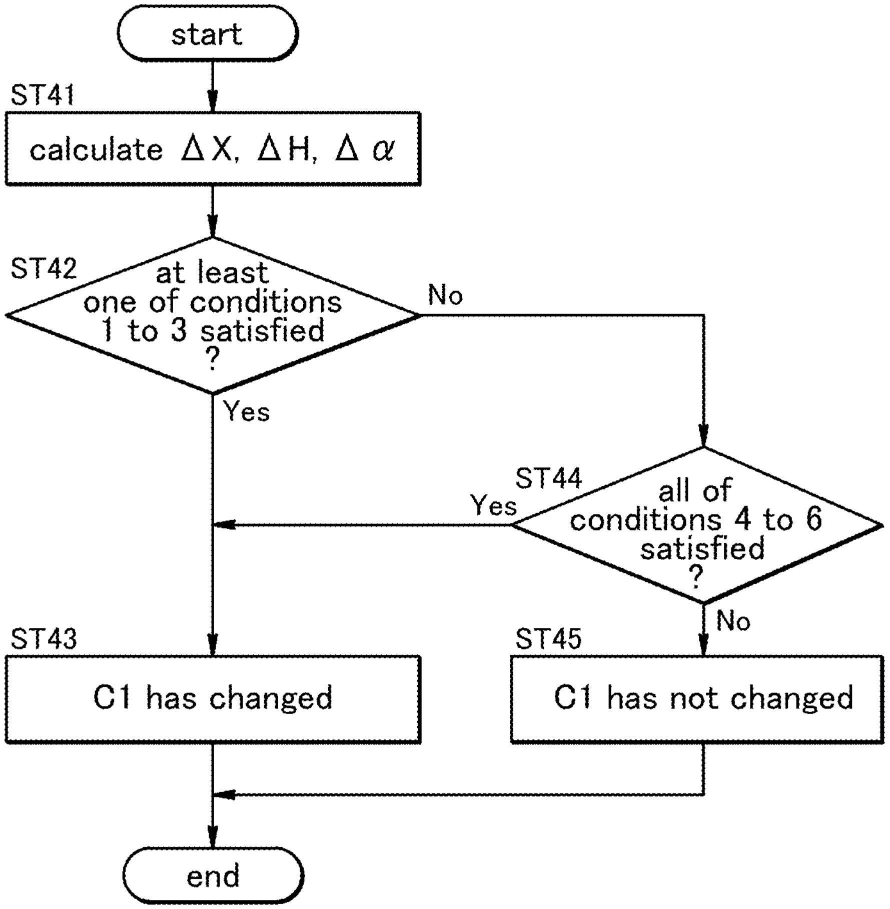
FIG. 11 is a flowchart showing a sound field change determination process according to the second embodiment.

With reference to FIGS. 10 and 11, when the sound field change determination process starts, the sound field change determination unit 87 respectively calculates the variation ΔX of the front-and-rear position of the first occupant seat 5, the variation λH of the height of the first occupant seat 5, and the variation Δα of the inclination angle of the first occupant seat 5 based on the current position Pc of the first occupant seat 5 and the reference position Pr of the first occupant seat 5 (step ST41).

Next, the sound field change determination unit 87 determines whether at least one of the following conditions 1 to 3 is satisfied (step ST42).

condition 1: The variation ΔX of the front-and-rear position of the first occupant seat 5 is greater than a first front-and-rear threshold.

condition 2: The variation λH of the height of the first occupant seat 5 is greater than a first height threshold.

condition 3: The variation Δα of the inclination angle of the first occupant seat 5 is greater than a first angle threshold.

In a case where at least one of the above conditions 1 to 3 is satisfied (step ST42: Yes), the sound field change determination unit 87 determines that the transfer function C1 of the secondary path has changed (step ST43).

In a case where none of the above conditions 1 to 3 is satisfied (step ST42: No), the sound field change determination unit 87 determines whether all of the following conditions 4 to 6 are satisfied (step ST44). A second front-and-rear threshold, a second height threshold, and a second angle threshold in the following conditions 4 to 6 are smaller than the first front-and-rear threshold, the first height threshold, and the first angle threshold in the above conditions 1 to 3, respectively.

condition 4: The variation $\Delta X$ of the front-and-rear position of the first occupant seat 5 is greater than the second front-and-rear threshold.

condition 5: The variation $\lambda H$ of the height of the first occupant seat 5 is greater than the second height threshold.

condition 6: The variation $\Delta\alpha$ of the inclination angle of the first occupant seat 5 is greater than the second angle threshold.

In a case where all of the above conditions 4 to 6 are satisfied (step ST44: Yes), the sound field change determination unit 87 determines that the transfer function C1 of the secondary path has changed (step ST43). In a case where at least one of the above conditions 4 to 6 is not satisfied (step ST44: No), the sound field change determination unit 87 determines that the transfer function C1 of the secondary path has not changed (step ST45).

<Update Process>

In the following, the difference between the update process according to the second embodiment and the update process according to the first embodiment (see FIG. 7) will be described.

In step ST21 of the update process according to the first embodiment, the sound field change determination unit 35 determines whether the transfer function C1 of the secondary path has changed based on the error signal e1 and the error signal e2. By contrast, in step ST21 of the update process according to the second embodiment, the sound field change determination unit 87 determines whether the transfer function C1 of the secondary path has changed based on the seat state information Is.

In a case where the secondary path filter C^1 is adaptively updated in the update process according to the second embodiment (step ST28), it is preferable to determine whether the transfer function C1 of the secondary path has changed based on the current position Pc of the first occupant seat 5 in step ST21 of the next update process. Accordingly, in the update process according to the second embodiment, when the fluctuation of the secondary path filter C^1 has converged (step ST29: Yes), the update process unit 89 updates the reference position Pr of the first occupant seat 5 to the current position Pc of the first occupant seat 5.

Modifications

In the second embodiment, the sound field change determination unit 87 determines whether the transfer function C1 of the secondary path has changed based on the seat state information Is. In another embodiment, the sound field change determination unit 87 may determine whether the transfer function C1 of the secondary path has changed based on the number of occupants, the outside temperature, the magnitude of the error signal e1, the change in the tire pressure, and the like.

The Third Embodiment

Next, with reference to FIGS. 12 and 13, the active noise reduction system 91 (hereinafter, referred to as "the noise reduction system 91") according to the third embodiment of the present invention will be described. The components other than a sound field change determination unit 94 of a controller 93 are the same as those of the second embodiment. Accordingly, the same reference numerals as those in the second embodiment are given to these components in the drawings, and the descriptions thereof will be omitted.

<Sound Field Change Determination Unit 94>

Figure 12:
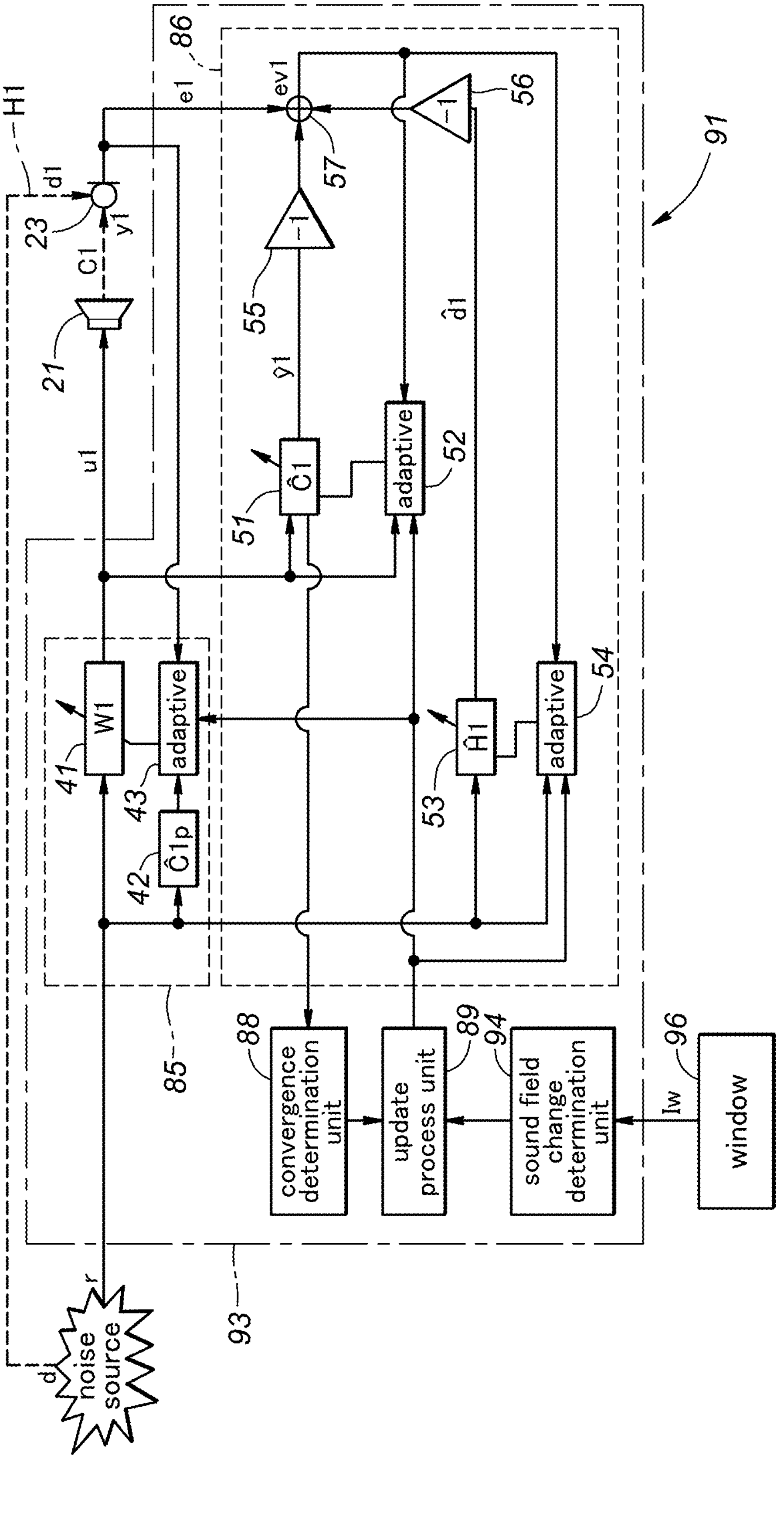
FIG. 12 is a functional block diagram showing an active noise reduction system according to the third embodiment.

With reference to FIG. 12, window open/close information Iw is transmitted from a window 96 (for example, a side window or a roof window) of the vehicle cabin 4 to the sound field change determination unit 94 of the controller 93. The window open/close information Iw is the information about the open/close state of the window 96.

<Sound Field Change Determination Process>

Next, the sound field change determination process performed by the sound field change determination unit 94 will be described. The sound field change determination process is a process for determining whether the transfer function C1 of the secondary path has changed. Hereinafter, the position of the window 96 in the current window open/close information Iw will be referred to as "the current position of the window 96", and the position of the window 96 in the previous window open/close information Iw will be referred to as "the reference position of the window 96".

Figure 13:
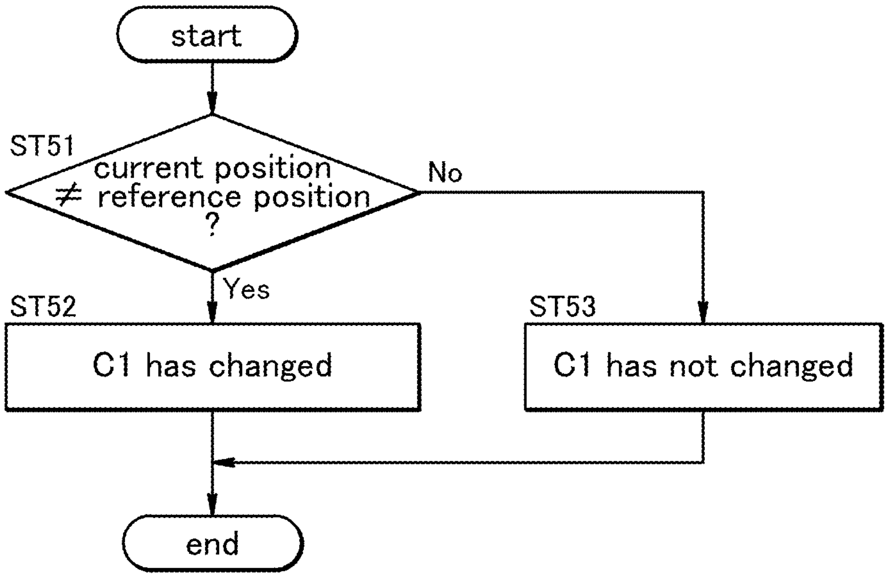
FIG. 13 is a flowchart showing a sound field change determination process according to the third embodiment.

With reference to FIG. 13, when the sound field change determination process starts, the sound field change determination unit 94 determines whether the current position of the window 96 does not match the reference position of the window 96 (step ST51). In other words, the sound field change determination unit 94 determines whether the window 96 is opened or closed.

In a case where the current position of the window 96 does not match the reference position of the window 96 (step ST51: Yes), the sound field change determination unit 94 determines that the transfer function C1 of the secondary path has changed (step ST52). In other words, in a case where the window 96 is opened or closed, the sound field change determination unit 94 determines that the transfer function C1 of the secondary path has changed.

In a case where the current position of the window 96 matches the reference position of the window 96 (step ST51: No), the sound field change determination unit 94 determines that the transfer function C1 of the secondary path has not changed (step ST53). In other words, in a case where the window 96 is not opened or closed, the sound field change determination unit 94 determines that the transfer function C1 of the secondary path has not changed.

<Update Process>

In the following, the difference between the update process according to the third embodiment and the update process according to the first embodiment (see FIG. 7) will be described.

In step ST21 of the update process according to the first embodiment, the sound field change determination unit 35 determines whether the transfer function C1 of the secondary path has changed based on the error signal e1 and the error signal e2. By contrast, in step ST21 of the update process according to the third embodiment, the sound field change determination unit 94 determines whether the transfer function C1 of the secondary path has changed based on the window open/close information Iw.

In a case where the secondary path filter C^1 is adaptively updated in the update process according to the third embodiment (step ST28), it is preferable to determine whether the transfer function C1 of the secondary path has changed based on the current position of the window 96 in step ST21 of the next update process. Accordingly, in the update process according to the third embodiment, when the fluctuation of the secondary path filter C^1 has converged (step ST29: Yes), the update process unit 89 updates the reference position of the window 96 to the current position of the window 96.

The Fourth Embodiment

Figure 14:
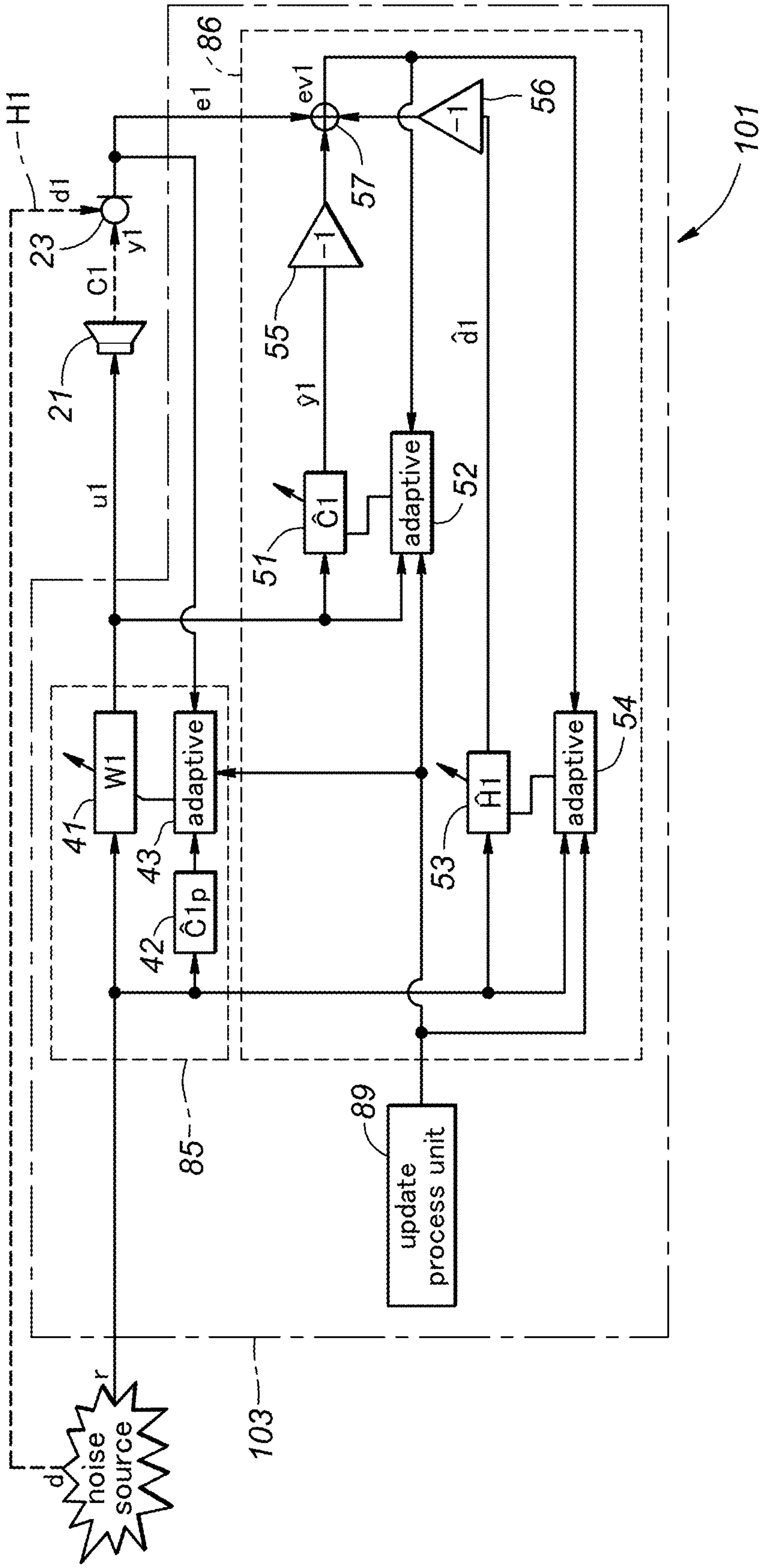
FIG. 14 is a functional block diagram showing an active noise reduction system according to the fourth embodiment.

Next, with reference to FIGS. 14 and 15, an active noise reduction system 101 (hereinafter, referred to as "the noise reduction system 101") according to the fourth embodiment of the present invention will be described. As shown in FIG. 14, the noise reduction system 101 has a configuration similar to that of the noise reduction system 81 according to the second embodiment except that a controller 103 does not include the sound field change determination unit 87 and the convergence determination unit 88. Accordingly, the same reference numerals as those in the second embodiment are given to the components of the noise reduction system 101 in the drawings, and the descriptions thereof will be omitted.

<Update Process>

Next, the update process performed by the controller 103 will be described. The update process is a process for updating the control filter W1, the secondary path filter C^1, the primary path filter H^1, and the auxiliary secondary path filter C^1*p*.

Figure 15:
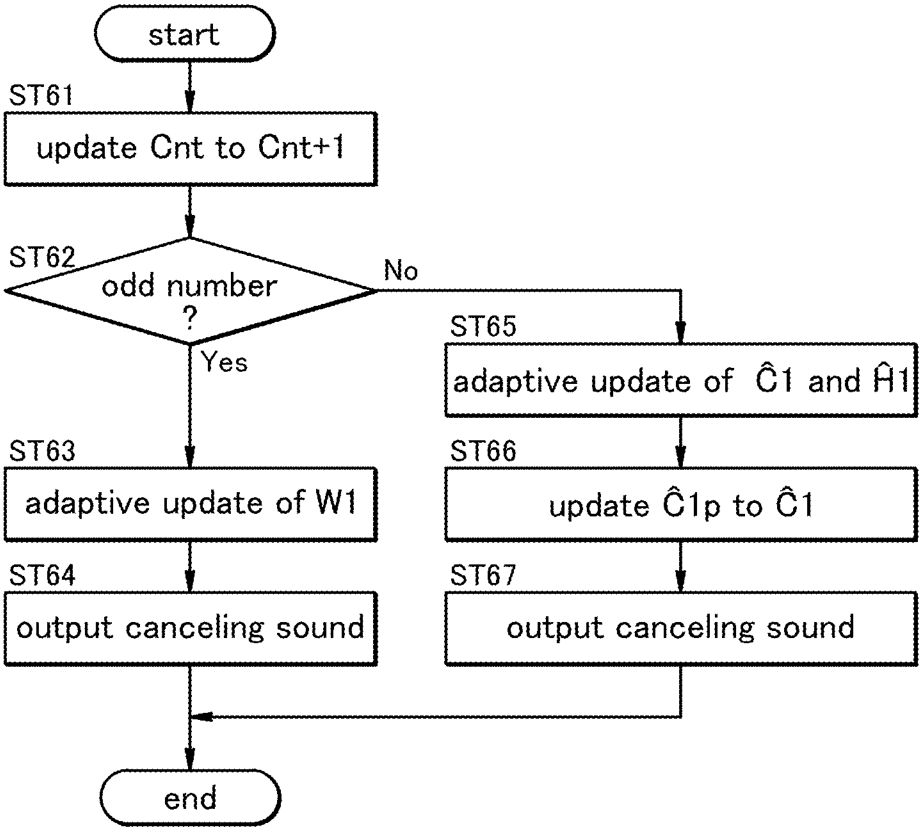
FIG. 15 is a flowchart showing an update process according to the fourth embodiment.

With reference to FIG. 15, when the update process starts, the update process unit 89 updates the number of times Cnt (initial value=0) of the update process to Cnt+1 (step ST61).

Next, the update process unit 89 determines whether the number of times Cnt is an odd number (step ST62). In a case where the number of times Cnt is an odd number (step ST62: Yes), the control signal generation unit 85 adaptively updates the control filter W1 (step ST63).

Next, the control signal generation unit 85 generates the control signal u1 using the adaptively updated control filter W1, and outputs the generated control signal u1 to the first speaker 21. Accordingly, the first speaker 21 outputs the canceling sound y1 (step ST64).

In a case where the number of times Cnt is an even number (step ST62: No), the sound field learning unit 86 adaptively updates the secondary path filter C^1 and the primary path filter H^1 (step ST65). Next, the update process unit 89 updates the auxiliary secondary path filter C^1*p* to the value of the secondary path filter C^1 by copying the value of the secondary path filter C^1 to the auxiliary secondary path filter C^1*p* (step ST66).

Next, the control signal generation unit 85 generates the control signal u1 using the temporarily fixed control filter W1 (the control filter W1 adaptively updated in the previous update process), and outputs the generated control signal u1 to the first speaker 21. Accordingly, the first speaker 21 outputs the canceling sound y1 (step ST67).

Modifications

In step ST62 of the update process in the fourth embodiment, the update process unit 89 determines whether the number of times Cnt is an odd number. Accordingly, one adaptive update of the control filter W1 and one adaptive update of the secondary path filter C^1 are performed alternately. In step ST62 of the update process according to another embodiment, the update process unit 89 may perform a determination different from the above determination. For example, the update process unit 89 may determine whether the number of times Cnt is a number other than a multiple of three. Accordingly, two adaptive updates of the control filter W1 and one adaptive update of the secondary path filter C^1 are performed alternately. In this way, "a case where the adaptive update of the control filter W1 and the adaptive update of the secondary path filter C^1 are performed alternately" includes not only a case where one adaptive update of the former and one adaptive update of the latter is performed alternately, but also a case where adaptive updates of the at least one of the former and the latter are performed successively.

The Fifth Embodiment

Next, with reference to FIGS. 16 to 18, an active noise reduction system 111 (hereinafter referred to as "the noise reduction system 111") according to the fifth embodiment of the present invention will be described. The descriptions that duplicate those in the first embodiment will be omitted.

<Noise Reduction System 111>

Figure 16:
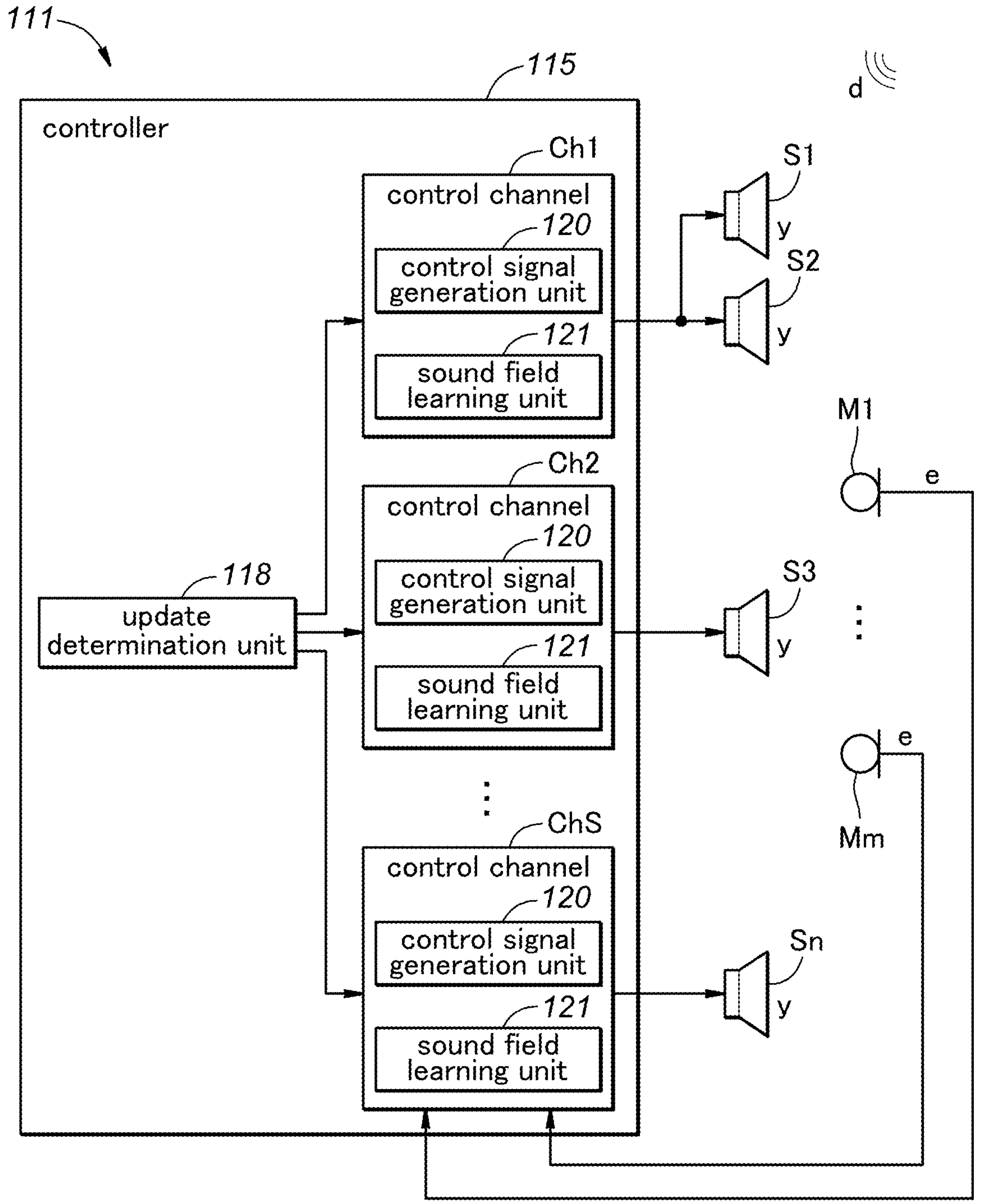
FIG. 16 is a functional block diagram showing an active noise reduction system according to the fifth embodiment.

With reference to FIG. 16, the noise reduction system 111 includes n (n=2) speakers S1 to Sn (an example of canceling sound output devices) each configured to output a canceling sound y for canceling the noise d, m (m=2) microphones M1 to Mm (an example of error microphones) each configured to generate an error signal e based on the noise d and the canceling sound y, and a controller 115 configured to control n speakers S1 to Sn based on the error signal e.

<Controller 115>

With reference to FIG. 16, the controller 115 includes S (2≤S≤n) control channels Ch1 to ChS corresponding to the n speakers S1 to Sn, and an update determination unit 118.

Each control channel Ch1 to ChS includes a control signal generation unit 120 and a sound field learning unit 121. The control signal generation unit 120 includes a control filter W and an auxiliary secondary path filter C^p. The sound field learning unit 121 includes a secondary path filter C^ and a primary path filter H^. The configurations of the control signal generation unit 120 and the sound field learning unit 121 are similar to the configurations of the control signal generation unit 85 and the sound field learning unit 86 according to the second embodiment. Accordingly, the descriptions thereof will be omitted.

The update determination unit 118 determines whether a transfer function C of a secondary path from one of the speakers S1 to Sn to one of the microphones M1 to Mm has changed using the same process as the sound field change determination process according to the first embodiment. The update determination unit 118 determines whether the fluctuation of the secondary path filter C^according to the adaptive update thereof (hereinafter referred to as "the fluctuation of the secondary path filter C^") has converged using the same process as the convergence determination process according to the first embodiment. The update determination unit 118 determines the order and timing of the adaptive updates of the filters.

With reference to FIG. 17, the update determination unit 118 stores an update process table T. In the update process table T, an error microphone and a reference microphone are set for each control channel Ch1 to ChS from among the m microphones M1 to Mm. The combination of the error microphone and the reference microphone for each control channel Ch1 to ChS may be set based on various parameters.

In the update process table T, a state (an update necessary state or an update unnecessary state) of the secondary path filter C^ is set for each control channel Ch1 to ChS. The state of the secondary path filter C^ is not a fixed value but a value that can be rewritten in the update process that will be described later.

In the update process table T, an update flag ("1: update" or "0: no update") of the secondary path filter C^ is set for each control channel Ch1 to ChS for which the state of the secondary path filter C^ is set to the update necessary state. In the update process table T, one control channel Ch1 to ChS for which the update flag of the secondary path filter C^ is set to "1: update" is switched in turn.

<Update Process>

Next, the update process performed in each control channel Ch1 to ChS will be described. The update process is a process for updating the control filter W, the auxiliary secondary path filter C^p, the secondary path filter C^, and the primary path filter H^ of each control channel Ch1 to ChS. Steps ST71 and ST72 of the update process according to the fifth embodiment are similar to steps ST21 and ST22 of the update process according to the first embodiment (see FIG. 7). Accordingly, the descriptions of these steps will be omitted.

Figure 18:
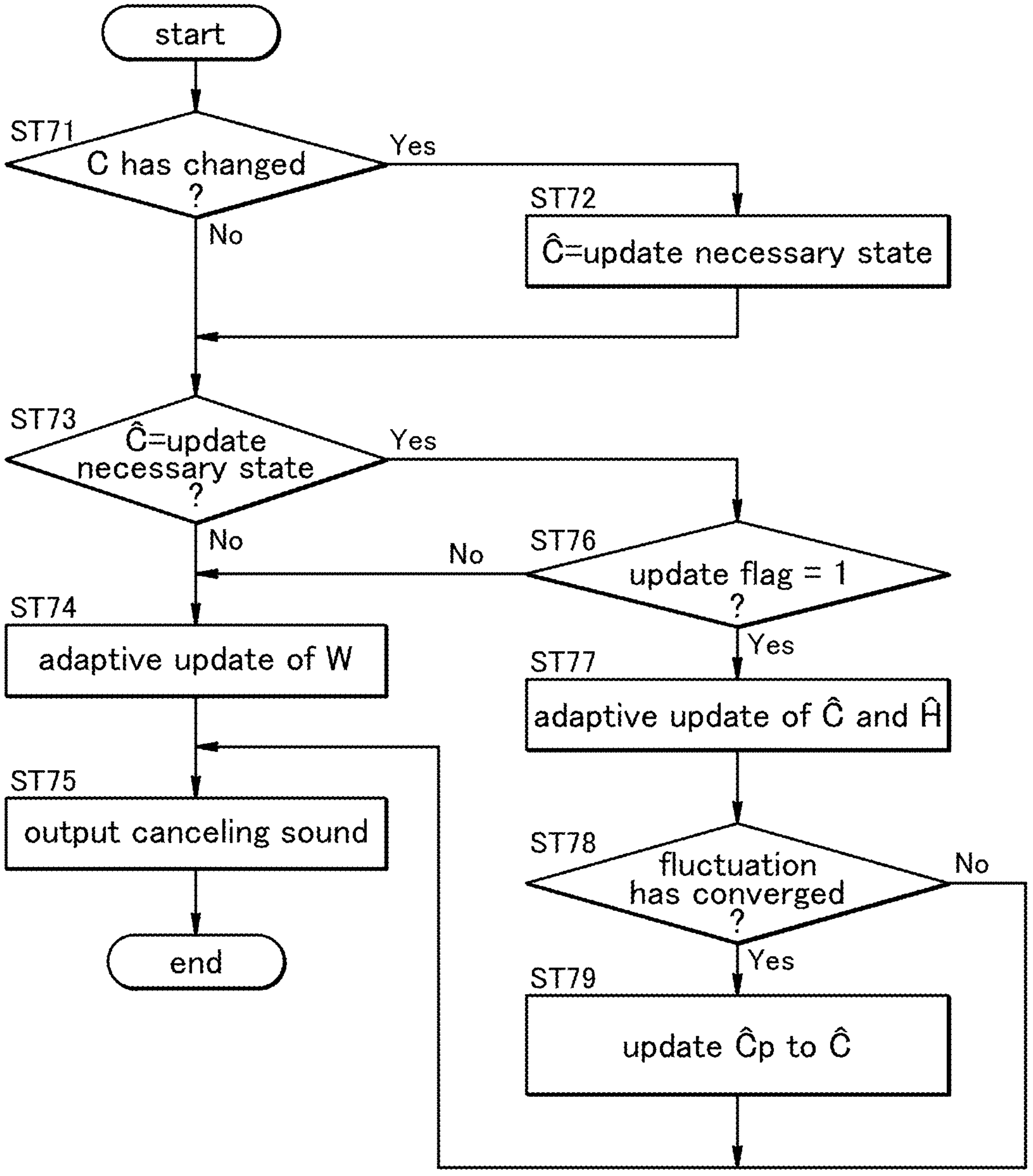
FIG. 18 is a flowchart showing an update process according to the fifth embodiment.

With reference to FIG. 18, when step ST72 of the update process ends, the update determination unit 118 determines whether the state of the secondary path filter C^ is set to the update necessary state (step ST73). In a case where the state of the secondary path filter C^ is not set to the update necessary state (step ST73: No), the control signal generation unit 120 adaptively updates the control filter W (step ST74).

Next, the control signal generation unit 120 generates the control signal u using the adaptively updated control filter W, and outputs the generated control signal u to the corresponding speaker S1 to Sn. Accordingly, the speaker S1 to Sn outputs the canceling sound y (step ST75). Accordingly, the update process ends.

In a case where the state of the secondary path filter CA is set to the update necessary state (step ST73: Yes), the update determination unit 118 determines whether the update flag of the secondary path filter C^ is set to "1: update" by referring to the update process table T (step ST76).

In a case where the update flag of the secondary path filter C^ is set to "0: no update" (step ST76: No), the speaker S1 to Sn outputs the canceling sound y in the above-mentioned step ST75 after the control filter W is adaptively updated in step ST74. Accordingly, the update process ends.

In a case where the update flag of the secondary path filter CA is set to "1: update" (step ST76: Yes), the sound field learning unit 121 adaptively updates the secondary path filter C^ and the primary path filter H^(step ST77).

Next, the update determination unit 118 determines whether the fluctuation of the secondary path filter C^ has converged (step ST78).

In a case where the fluctuation of the secondary path filter C^ has converged (step ST78: Yes), the update determination unit 118 updates the auxiliary secondary path filter C^p to the value of the secondary path filter C^ by copying the value of the secondary path filter C^ to the auxiliary secondary path filter C^p (step ST79). Next, in the above-mentioned step ST75, the speaker S1 to Sn outputs the canceling sound y. Accordingly, the update process ends.

In a case where the fluctuation of the secondary path filter C^ has not converged (step ST78: No), the speaker S1 to Sn outputs the canceling sound y in the above-mentioned step ST75 without the update of the auxiliary secondary path filter C^p to the value of the secondary path filter C^ by the update determination unit 118. Accordingly, the update process ends.

Effects

As described above, the controller 115 differentiates the timing of the adaptive update of the secondary path filter C^ in each control channel Ch1 to ChS. Accordingly, as compared with a case where the adaptive update of the secondary path filter C^ in each control channel Ch1 to ChS is performed simultaneously, it is possible to reduce the calculation amount of the controller 115 during the updates of the filters. Accordingly, the controller 115 does not need to be composed of an expensive processor, so that the increase in the manufacturing cost of the noise reduction system 111 can be suppressed.

Modifications

Figure 19:
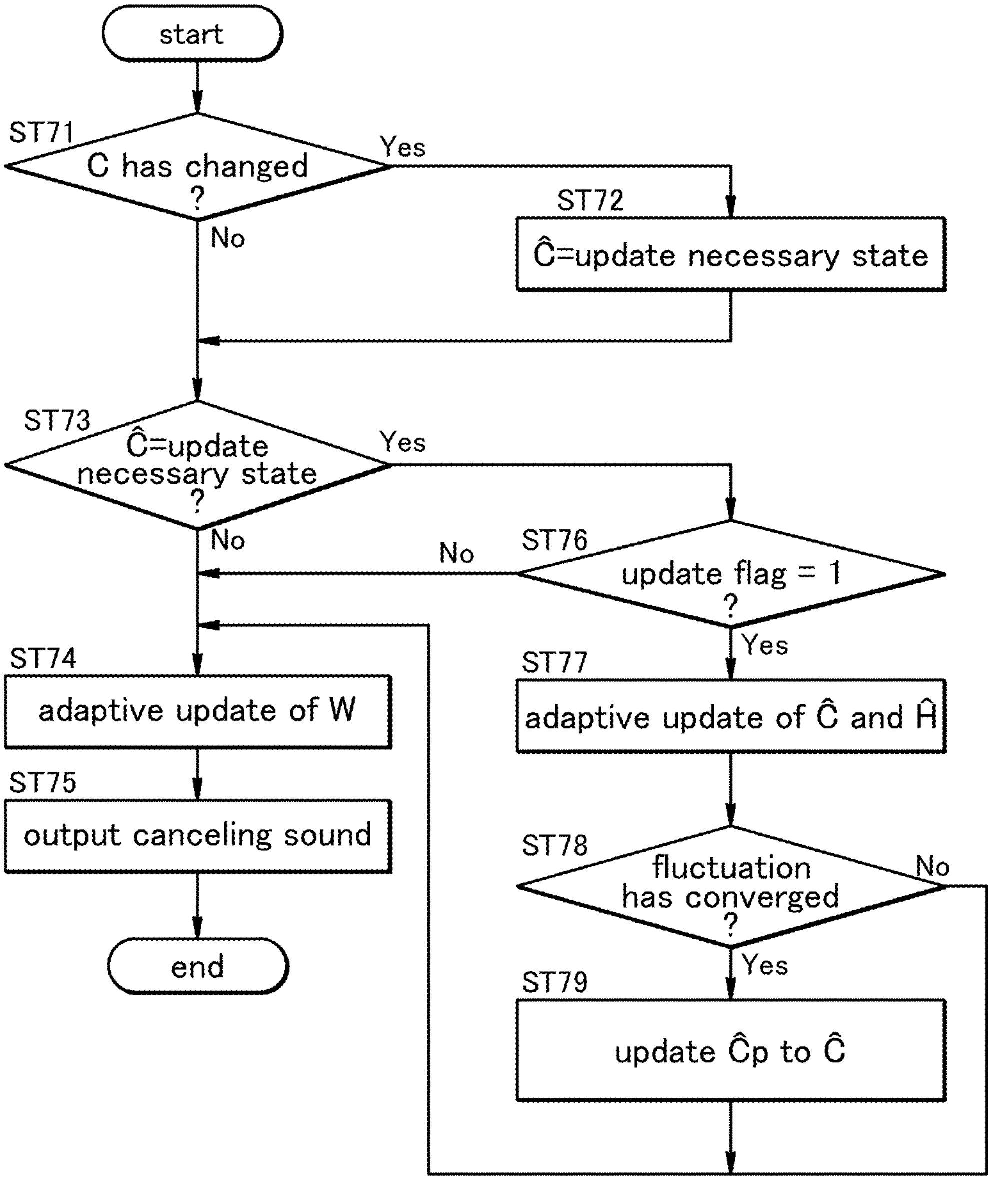
FIG. 19 is a flowchart showing an update process according to another embodiment.

With reference to FIG. 18, in the update process according to the fifth embodiment, in a case where the secondary path filter C^ is adaptively updated (step ST77), the speaker S1 to Sn outputs the canceling sound y without the adaptive update of the control filter W (step ST75). With reference to FIG. 19, in another embodiment, in a case where the secondary path filter C^ is adaptively updated (step ST77), the speaker S1 to Sn may output the canceling sound y (step ST75) after the control filter W is adaptively updated (step ST74). Accordingly, the adaptive update of the control filter W is performed in every update process, so that the response of the noise reduction control to the noise d can be improved.

In the update process shown in FIG. 8, the adaptive update of the control filter W1 and the adaptive update of the secondary path filter C^1 are performed alternately in a case where the transfer function C1 of the secondary path has changed, and the adaptive update of only the control filter W1 is performed in a case where the transfer function C1 of the secondary path has not changed (hereinafter referred to as "the update process 1"). In the update process shown in FIG. 19, the adaptive update of the control filter W is performed every time regardless of whether the secondary path filter CA is adaptively updated (hereinafter referred to as "the update process 2"). In another embodiment, either the update process 1 or the update process 2 may be selectively performed in each control channel Ch1 to ChS. For example, the update process 2 may be performed in a case where the variation in the secondary path filter C^ is greater than a prescribed value, and the update process 1 may be performed in a case where the variation in the secondary path filter C^ is equal to or less than the prescribed value.

Modifications

In the above first to fifth embodiments, the noise reduction system 1, 81, 91, 101, and 111 is applied to the vehicle cabin 4 of the vehicle 3. In another embodiment, the noise reduction system 1, 81, 91, 101, and 111 may be applied to an interior space of a moving body (for example, a ship or an aircraft) other than the vehicle 3, or to an interior space of a fixed object (for example, a house).

Concrete embodiments of the present invention have been described in the foregoing, but the present invention should not be limited by the foregoing embodiments and various modifications and alterations are possible within the scope of the present invention.

The invention claimed is:

1. An active noise reduction system, comprising:

a canceling sound output device configured to output a canceling sound for canceling a noise;

an error microphone configured to generate an error signal based on the noise and the canceling sound; and a controller configured to control the canceling sound output device based on the error signal, wherein the controller includes:

a control signal generation unit including a control filter configured to generate a control signal for controlling the canceling sound output device; and a sound field learning unit including a secondary path filter that represents an estimation value of a transfer function of a secondary path from the canceling sound output device to the error microphone, the control filter and the secondary path filter are configured to be adaptively updated, and the controller is configured to differentiate a timing of an adaptive update of the control filter and a timing of an adaptive update of the secondary path filter, wherein in a case where a fluctuation of the secondary path filter according to the adaptive update thereof has converged, the controller alternately performs the adaptive update of the control filter and the adaptive update of the secondary path filter, and in a case where the fluctuation of the secondary path filter according to the adaptive update thereof has not converged, the controller repeats the adaptive update of the secondary path filter without the adaptive update of the control filter until the fluctuation of the secondary path filter according to the adaptive update thereof converges.

2. An active noise reduction system, comprising:

a canceling sound output device configured to output a canceling sound for canceling a noise;

an error microphone configured to generate an error signal based on the noise and the canceling sound; and a controller configured to control the canceling sound output device based on the error signal, wherein the controller includes:

a control signal generation unit including a control filter configured to generate a control signal for controlling the canceling sound output device; and a sound field learning unit including a secondary path filter that represents an estimation value of a transfer function of a secondary path from the canceling sound output device to the error microphone, the control filter and the secondary path filter are configured to be adaptively updated, and the controller is configured to differentiate a timing of an adaptive update of the control filter and a timing of an adaptive update of the secondary path filter, wherein the control signal generation unit further includes an auxiliary secondary path filter that represents the estimation value of the transfer function of the secondary path, and the controller is configured to determine whether a fluctuation of the secondary path filter according to the adaptive update thereof has converged, and update the auxiliary secondary path filter by copying a value of the secondary path filter to the auxiliary secondary path filter in a case where the fluctuation of the secondary path filter according to the adaptive update thereof has converged.

3. The active noise reduction system according to claim 2, wherein the controller is configured to determine whether the fluctuation of the secondary path filter according to the adaptive update thereof has converged based on a variation in at least one of an amplitude of the secondary path filter and a phase of the secondary path filter.

4. The active noise reduction system according to claim 2, wherein one of the canceling sound output device and the error microphone is installed in an occupant seat of a vehicle, another of the canceling sound output device and the error microphone is installed in a portion of the vehicle other than the occupant seat, and the controller is configured to stop the adaptive update of the secondary path filter in a case where the fluctuation of the secondary path filter according to the adaptive update thereof has converged, determine whether the transfer function of the secondary path has changed based on a state of the occupant seat in a state where the adaptive update of the secondary path filter is stopped, and resume the adaptive update of the secondary path filter in a case where the transfer function of the secondary path has changed.

5. The active noise reduction system according to claim 4, wherein the controller is configured to acquire a plurality of variations among a variation in a front-and-rear position of the occupant seat, a variation in a height of the occupant seat, and a variation in an inclination angle of a reclining portion of the occupant seat, set a first threshold and a second threshold for each of the plurality of variations, the second threshold being smaller than the first threshold, and determine that the transfer function of the secondary path has changed in a case where at least one of the plurality of variations is greater than the first threshold and a case where all of the plurality of variations are greater than the second threshold.

6. The active noise reduction system according to claim 2, wherein at least one of the canceling sound output device and the error microphone is installed in a vehicle cabin of a vehicle, and the controller is configured to stop the adaptive update of the secondary path filter in a case where the fluctuation of the secondary path filter according to the adaptive update thereof has converged, determine whether the transfer function of the secondary path has changed based on an open/close state of a window of the vehicle cabin in a state where the adaptive update of the secondary path filter is stopped, and resume the adaptive update of the secondary path filter in a case where the transfer function of the secondary path has changed.

7. The active noise reduction system according to claim 1, wherein the sound field learning unit further includes a primary path filter that represents an estimation value of a transfer function of a primary path from a noise source to the error microphone, the primary path filter is configured to be adaptively updated, and the controller is configured to normalize an adaptive update amount of the secondary path filter and an adaptive update amount of the primary path filter using a common normalization divisor.

8. The active noise reduction system according to claim 7, wherein the primary path filter is configured to be adaptively updated based on a reference signal corresponding to the noise, the secondary path filter is configured to be adaptively updated based on the control signal, and the common normalization divisor includes a norm of a signal vector of the reference signal and a norm of a signal vector of the control signal.

9. The active noise reduction system according to claim 2, further comprising a reference microphone provided separately from the error microphone, the reference microphone is configured to generate a determination signal based on at least the noise, the controller is configured to stop the adaptive update of the secondary path filter in a case where the fluctuation of the secondary path filter according to the adaptive update thereof has converged, determine whether the transfer function of the secondary path has changed based on the error signal and the determination signal in a state where the adaptive update of the secondary path filter is stopped, and resume the adaptive update of the secondary path filter in a case where the transfer function of the secondary path has changed.

10. The active noise reduction system according to claim 9, wherein the controller includes a second control signal generation unit that is provided separately from the control signal generation unit, and a microphone corresponding to the second control signal generation unit is used as the reference microphone.

11. The active noise reduction system according to claim 9, wherein the controller is configured to determine that the transfer function of the secondary path has changed in a case where a difference between the error signal and the determination signal is equal to or greater than a first reference value and a temporal variation in the error signal is equal to or greater than a second reference value.

12. The active noise reduction system according to claim 11, wherein the controller is configured to determine that the transfer function of the secondary path has changed in a case where the difference between the error signal and the determination signal is equal to or greater than the first reference value, the temporal variation in the error signal is equal to or greater than the second reference value, and the error signal is equal to or greater than a third reference value.

13. An active noise reduction system, comprising:

a canceling sound output device configured to output a canceling sound for canceling a noise;

an error microphone configured to generate an error signal based on the noise and the canceling sound; and a controller configured to control the canceling sound output device based on the error signal, wherein the controller includes:

a control signal generation unit including a control filter configured to generate a control signal for controlling the canceling sound output device; and a sound field learning unit including a secondary path filter that represents an estimation value of a transfer function of a secondary path from the canceling sound output device to the error microphone, the control filter and the secondary path filter are configured to be adaptively updated, the controller includes a plurality of control channels each including the control signal generation unit and the sound field learning unit, and the controller is configured to differentiate a timing of an adaptive update of the secondary path filter in each of the control channels.

* * * * *